(12) United States Patent
Finateu et al.

(10) Patent No.: US 12,470,849 B2
(45) Date of Patent: Nov. 11, 2025

(54) EVENT SENSOR PIXEL WITH SENSITIVITY AND DYNAMIC RANGE OPTIMIZATION

(71) Applicant: PROPHESEE, Paris (FR)

(72) Inventors: Thomas Finateu, Veneux les Sablons (FR); Daniel Matolin, Freital (DE); Christoph Posch, Bad Fischau-Brunn (AT)

(73) Assignee: Prophesee, Paris (FR)

( * ) Notice: Subject to any disclaimer, the term of this patent is extended or adjusted under 35 U.S.C. 154(b) by 105 days.

(21) Appl. No.: 18/540,381

(22) Filed: Dec. 14, 2023

(65) Prior Publication Data

US 2024/0205567 A1 Jun. 20, 2024

Related U.S. Application Data

(60) Provisional application No. 63/387,685, filed on Dec. 15, 2022.

(51) Int. Cl.
*H04N 25/772* (2023.01)
*H04N 25/47* (2023.01)
(Continued)

(52) U.S. Cl.
CPC .......... *H04N 25/772* (2023.01); *H04N 25/47* (2023.01); *H04N 25/57* (2023.01); *H04N 25/778* (2023.01); *H04N 25/79* (2023.01); *H10F 39/809* (2025.01)

(58) Field of Classification Search
CPC ...... H04N 25/772; H04N 25/47; H04N 25/57; H04N 25/778; H04N 25/79; H04N 25/707; H10F 39/809
See application file for complete search history.

(56) References Cited

U.S. PATENT DOCUMENTS 9,967,479 B2 * 5/2018 Matolin ............... H04N 3/155
2005/0224903 A1 * 10/2005 Augusto ............... H04N 25/76
348/E3.018

(Continued)

FOREIGN PATENT DOCUMENTS

EP 3047647 B1 7/2016
JP H0945893 A 2/1997

OTHER PUBLICATIONS

International Search Report and Written Opinion of International Application No. PCT/EP2023/085984, dated Apr. 8, 2024, 22 pages.

*Primary Examiner* — Chiawei Chen
(74) *Attorney, Agent, or Firm* — Finnegan, Henderson, Farabow, Garrett & Dunner, LLP

(57) ABSTRACT

A pixel circuit is provided for use in an event sensor. In one implementation, the pixel circuit includes a photosensitive element configured to generate a current signal in response to brightness of light impinging on the photosensitive element, a first N-type transistor, a second N-type transistor, a first P-type transistor including a gate connected to a first bias voltage, a second P-type transistor including a gate connected to a second bias voltage, the second bias voltage being an adjustable DC bias voltage that is adjusted according to at least one of a sensed temperature or a fabrication process variation of the pixel circuit, and a voltage output that varies in response to the brightness of light impinging on the photosensitive element. An adjustment of the second bias voltage causes a DC level of the voltage output to shift up or down without changing the overall gain of the pixel circuit. The pixel circuit may also include one or more additional N-type transistors for increasing performance by optimizing contrast sensitivity. The pixel circuit may further include a converter, a capacitor electrically coupled to the converter, and an amplifier electrically coupled to the (Continued)

capacitor. Further, the pixel circuit may be implemented in a stacked wafer configuration and one or more interconnects between wafers.

58 Claims, 30 Drawing Sheets

(51) Int. Cl.
*H04N 25/57* (2023.01)
*H04N 25/778* (2023.01)
*H04N 25/79* (2023.01)
*H10F 39/00* (2025.01)

(56) References Cited

U.S. PATENT DOCUMENTS

| | | | |
|---|---|---|---|
| 2012/0218445 A1* | 8/2012 | Petilli | H04N 25/773 250/214 R |
| 2017/0170224 A1* | 6/2017 | Huang | H10D 88/01 |
| 2018/0227516 A1* | 8/2018 | Mo | H04N 25/59 |
| 2018/0227518 A1* | 8/2018 | Ganguly | H04N 25/585 |
| 2018/0231645 A1* | 8/2018 | Droz | G01S 7/497 |
| 2019/0288024 A1* | 9/2019 | Berner | H10F 39/80373 |
| 2022/0155425 A1* | 5/2022 | Droz | H04N 25/77 |
| 2022/0337767 A1 | 10/2022 | Cadugan | |
| 2023/0116531 A1* | 4/2023 | Wang | H04N 25/57 348/294 |
| 2024/0348950 A1* | 10/2024 | Kim | H04N 25/79 |

* cited by examiner

EVENT SENSOR PIXEL WITH SENSITIVITY AND DYNAMIC RANGE OPTIMIZATION

TECHNICAL FIELD

The present disclosure generally relates to the field of sensors and pixel circuits for sensing and other applications. More specifically, and without limitation, this disclosure relates to pixel circuits and architectures related thereto with optimized sensitivity and dynamic range for implementing event-based vision sensors and other sensor and vision systems. The pixel circuits and features disclosed herein may be used in various systems and applications, such as security systems, production line monitoring applications, autonomous vehicles, navigation systems, and other systems and applications that benefit from pixel sensitivity and dynamic range optimization.

BACKGROUND

Pixel circuits may be used in a wide range of applications, including event vision sensors. Examples of such sensors include contrast detection sensors, temporal contrast event sensors, and dynamic vision sensors.

A pixel circuit used in event vision sensors often includes a number of circuit elements, including a photosensitive element (e.g., a photodiode) configured to generate a current signal in response to the brightness of light impinging on the photosensitive element. Some of these circuits use transistors to convert the current signal generated by the photosensitive element into a voltage signal ($V_{pr\_out}$) for further processing. Exemplary state-of-the-art pixel front-end circuits used in temporal contrast event sensors are shown in FIGS. 1A and 1B.

Temporal contrast event sensors typically achieve better application performance when the contrast sensitivity of the pixels is increased. This may be achieved by increasing the gain of the signal path between the photosensitive element and a comparator used for detecting the contrast events. The extant circuit illustrated in FIG. 1B, for example, increases the gain of the current-to-voltage conversion by a factor of about 2 with respect to the circuit illustrated in FIG. 1A.

The inventors of the present disclosure have found that it is beneficial to maintain contrast sensitivity over a wide range of illuminance and that this may be achieved while avoiding signal saturation. The saturation-free range of operation of illuminance is often called the dynamic range.

Event vision sensors fabricated using wafer stacking technology often include one hybrid bonding interconnect per pixel between a top wafer and a bottom wafer. The top wafer may be fabricated using a specialized CMOS Image Sensor (CIS) semiconductor fabrication process, while the bottom wafer may be fabricated using a high-performance analog CMOS semiconductor fabrication process.

Circuit elements may be formed in the same or different wafers in comparison to one another. Partitioning of the circuit elements of an event sensor pixel circuit between the CMOS and CIS wafers is typically implemented with only the photodiode on the CIS wafer. Another known partitioning option is to have the photodiode and one or more NMOS transistors on the same CIS wafer.

Placing the N-type (e.g., NMOS) transistors on the CIS wafer allows for their removal from the CMOS wafer, which is already very dense. Also, while implementing NMOS transistors on the CIS wafer allows for smaller pixel pitch, it also reduces the photosensitive area. CIS wafer fabrication processes often allow for only photodiode and NMOS transistors on the CIS wafer, at least within the pixel area. P-type (e.g., PMOS) transistors are often not allowed for sake of process optimization. NMOS transistors connected to the photodiode can be optimized for operation together with the photodiode if placed in close proximity on the same wafer as the photodiode. Some CIS wafer fabrication processes do allow both N-type (e.g., NMOS) and P-type (e.g., PMOS) transistors within the pixel area. FIG. 1C shows an example of the circuit of FIG. 1A implemented via a stacked "CIS on CMOS" wafer fabrication processes with the photodiode and all transistors of the front-end circuit placed on the CIS layer. The hybrid bonding connection to the rest of the pixel circuit on the CMOS layer is indicated by the cylindrical shape at the $V_{pr\_out}$ node.

Extant pixel circuit implementations such as those discussed above may have one or more drawbacks. For example, they may exhibit an output voltage ($V_{pr\_out}$) versus light (illuminance) relationship having a low gain, and thus a less-than-optimal contrast sensitivity. One technique to boost the gain, as discussed above, comprises the placement of additional (e.g., NMOS) transistors in the photodiode branch to affect a gain boost and thereby improve the contrast sensitivity. The fallback of such a technique to boost gain, however, is that the dynamic range is reduced because saturation can occur for higher temperatures close to the ground and for lower temperature close to the power supply. Another approach to correct this drawback is to increase the power supply voltage and hence the available saturation-free signal range. However, such an approach requires higher power consumption and increases the potential for reliability issues.

Another issue with extant implementations for pixel circuits is the low-light degradation for higher temperatures, as symbolized by a non-linear compression towards lower light in the "red" output voltage versus illuminance curve.

In view of the above and other drawbacks of available techniques and implementations, there is a need for improved pixel circuits for sensing and other applications. For example, there is a need for improved event sensor pixel circuits with greater sensitivity and dynamic range optimization. The present disclosure includes embodiments for addressing these and other objects, including novel pixel circuit arrangements and solutions to properly mitigate dynamic range issues over temperature and/or fabrication process, as further described below.

SUMMARY

Embodiments of the present disclosure relate to pixel circuits with improved features and properties. Pixel circuits consistent with the present disclosure may be implemented for event-based vision sensors and other sensors and vision systems. Pixel circuits consistent with the present disclosure may be arranged using a stacked or non-stacked configuration. In addition, as disclosed herein, pixel circuits may be implemented with an adjustable DC bias voltage. Advantageously, pixel circuits consistent with the embodiments of the present disclosure can provide greater pixel sensitivity and dynamic range optimization.

By way of example, a pixel circuit is provided that includes a photosensitive element configured to generate a current signal in response to a brightness of light impinging on the photosensitive element, a first N-type transistor, a second N-type transistor, a first P-type transistor including a gate connected to a first bias voltage, a second P-type transistor including a gate connected to a second bias voltage, and a voltage output that varies in response to the brightness of light impinging on the photosensitive element. The second P-type transistor may affect a gain boost, such as a gain boost by a factor of approximately two. The pixel circuit may be arranged in a stacked or non-stacked configuration, as disclosed herein.

In accordance with embodiments of the present disclosure, the second bias voltage of the pixel circuit may be an adjustable DC bias voltage. For example, the bias voltage may be adjusted to cause a DC level of the voltage output to shift up or down without changing an overall gain of the pixel circuit. Additionally, as disclosed herein, adjustment of the bias voltage may increase a saturation-free operating range of the pixel circuit and thereby improve a dynamic range of the pixel circuit. In addition, pixel sensitivity may be optimized.

Embodiments of the present disclosure include pixel circuits in which the second bias voltage (e.g., a DC bias voltage) is automatically adjusted in response to temperature fluctuations and/or statically adjusted according to fabrication process parameter variations. In some embodiments, an on-chip temperature sensitive biasing circuit may be used to continuously sense the chip temperature and automatically adjust the bias voltage (e.g., the second bias voltage of the pixel circuit) in response to the chip temperature. As another example, the bias voltage may be statically adjusted (e.g., at one time or prior to use) to address fabrication process parameter variations (e.g., a global threshold voltage) and increase a saturation-free operating range of the pixel circuit and thereby improve a dynamic range of the pixel circuit. For example, in some embodiments, a biasing circuit may be used that is configured to sense the process parameters of the chip and adjust the bias voltage. The static type of bias voltage adjustment may provide compensation for the effects of fabrication process parameters varying from chip to chip. As disclosed herein, a compensation voltage signal may be generated by the biasing circuit and applied to adjust the bias voltage (e.g., the second bias voltage of the pixel circuit). In some embodiments, a temperature sensitive biasing circuit or a biasing circuit configured to sense process parameters may comprise a third P-type transistor in series with a third N-type transistor, a programmable current source, and a programmable voltage source. Furthermore, in some embodiments, the third P-type transistor of the biasing circuit may correspond to a P-type transistor of a connected pixel circuit, and/or the third N-type transistor of the biasing circuit may correspond to an N-type transistor of a connected pixel circuit.

The above and other features may be provided. For example, the pixel circuit may further include a third N-type transistor including a gate connected to a DC voltage, wherein the third N-type transistor provides leakage compensation at low light levels impinging on the photosensitive element. In some embodiments of the pixel circuit, the second P-type transistor, the third N-type transistor, and one or more other components of the pixel circuit are implemented in a common wafer in a non-stacked configuration.

In some embodiments of the pixel circuit, the third N-type transistor is implemented in a common wafer with the second P-type transistor and the first and second N-type transistors. The common wafer may include a first CMOS wafer. In some embodiments, the photosensitive element is implemented in a second CMOS wafer with the first CMOS wafer being stacked relative to the second CMOS wafer. There may be at least one in-pixel interconnect between the first CMOS wafer and the second CMOS wafer. As a further example, the first N-type transistor, the second N-type transistor, the third N-type transistor, and the photosensitive element may be implemented on a common wafer. Also, the common wafer may include a CMOS Image Sensor (CIS) wafer. As a further example, the second P-type transistor may be implemented in a CMOS wafer, wherein the CMOS wafer is stacked relative to the CIS wafer. Still further, there may be one or more interconnects between the CMOS wafer and the CIS wafer.

In some embodiments, the pixel circuit may further include a converter configured to receive the current signal from the photosensitive element and generate a voltage signal based on the received current signal. The converter may be implemented with the second P-type transistor and provide a logarithmic current-to-voltage converter, for example. The pixel circuit may also include a first capacitor electrically coupled to the converter in series and configured to receive the voltage signal from the converter. Also, the pixel circuit may include an amplifier electrically coupled, at an input, to the first capacitor in series and configured to generate, at an output, an amplified signal based on an output signal from the first capacitor. Also, in some embodiments, the photosensitive element may comprise a photodiode.

In some embodiments of the pixel circuit, the converter, and the first capacitor are implemented in a CMOS wafer with the second P-type transistor. Also, the pixel circuit may further include a second capacitor connected in parallel with the first capacitor, the second capacitor being implemented in a CIS wafer and connected to the first capacitor using at least two interconnects. The second capacitor in combination with the first capacitor may increase a capacitance of the amplifier and, in combination with a third capacitor, increase the overall gain of the pixel circuit. A continuous adjustment of the second bias voltage (e.g., a DC bias voltage) responsive to the chip temperature may increase a saturation-free operating range of the pixel circuit and thereby improve a dynamic range of the pixel circuit by increasing the voltage headroom. As a still further example, in some embodiments, an adjustment of the bias voltage in response to fabrication process variation(s) (e.g., a global threshold voltage variation whereby larger thresholds can reduce the voltage headroom and lead to reduced dynamic range; reducing the bias voltage in response to this variation can mitigate and address the impact of this fabrication process variation) may increase a saturation-free operating range of the pixel circuit and thereby improve a dynamic range of the pixel circuit.

Embodiments of the present disclosure may further provide an event sensor with a plurality of pixels, each pixel including a pixel circuit, the pixel circuit comprising a photosensitive element configured to generate a current signal in response to a brightness of light impinging on the photosensitive element. The pixel circuit may also include a first N-type transistor, a second N-type transistor, a first P-type transistor including a gate connected to a first bias voltage, and a second P-type transistor including a gate connected to a second bias voltage, wherein the second bias voltage is an adjustable DC bias voltage. Also, the pixel circuit may include a voltage output that varies in response to the brightness of light impinging on the photosensitive element. In some embodiments, the second P-type transistor affects a gain boost, such as a gain boost by a factor of approximately two. In some embodiments, an adjustment of the second bias voltage causes a DC level of the voltage output to shift up or down without changing an overall gain of the pixel circuit. Additionally, or alternatively, an adjustment of the second bias voltage (e.g., a DC bias voltage) increases a saturation-free operating range of the pixel circuit and thereby improves a dynamic range of the pixel circuit.

In some embodiments, the second bias voltage is an adjustable bias voltage. For example, the bias voltage may be automatically adjusted according to temperature and/or statically adjusted according to fabrication process parameter variations. In some embodiments, an on-chip temperature sensitive temperature sensitive biasing circuit may be used to automatically adjust the bias voltage (e.g., the second bias voltage of the pixel circuit) responsive to the chip temperature. As another example, the bias voltage may be statically adjusted (e.g., at one time or before use of the pixel circuit) to address fabrication process parameter variations (e.g., a global threshold voltage variation) and increase a saturation-free operating range of the pixel circuit and thereby improve a dynamic range of the pixel circuit. For example, in some embodiments, a biasing circuit may be used that is configured to sense the process parameters of the chip or a wafer of the pixel circuit and adjust the bias voltage. The static type of bias voltage adjustment may provide compensation for the effects of fabrication process parameters varying from chip to chip. As disclosed herein, a compensation voltage signal may be generated by the biasing circuit and applied to correct the bias voltage (e.g., the second bias voltage of the pixel circuit). In some embodiments, a temperature sensitive biasing circuit or a biasing circuit configured to sense process parameters may comprise a third P-type transistor in series with a third N-type transistor, a programmable current source, and a programmable voltage source. Furthermore, in some embodiments, the third P-type transistor of the biasing circuit may correspond to a P-type transistor of a connected pixel circuit, and/or the third N-type transistor of the biasing circuit may correspond to an N-type transistor of a connected pixel circuit.

The above and other features may be provided. For example, the second P-type transistor, and one or more other components of the pixel circuit may be implemented in a non-stacked, common wafer. Also, the event sensor may further comprise a third N-type transistor including a gate connected to a DC voltage, wherein the third N-type transistor provides leakage compensation at low light levels impinging on the photosensitive element. The P-type transistor, the third N-type transistor, and one or more other components of the pixel circuit may be implemented in a common wafer in a non-stacked configuration. Also, the third N-type transistor may be implemented in a common wafer with the second P-type transistor and the first and second N-type transistors. The common wafer comprises a first CMOS wafer.

In the above example, the photosensitive element may be implemented in a second CMOS wafer, with the second CMOS wafer being stacked relative to the first CMOS wafer. There may be at least one in-pixel interconnect between the first CMOS wafer and the second CMOS wafer. As a further example, the first N-type transistor, the second N-type transistor, the third N-type transistor, and the photosensitive element may be implemented on a common wafer. Also, the common wafer may comprise a CMOS Image Sensor (CIS) wafer. As a further example, the second P-type transistor may be implemented in a CMOS wafer, with the CMOS wafer being stacked relative to the CIS wafer. Still further, there may be a plurality of interconnects between the CMOS wafer and the CIS wafer.

In some embodiments, the event sensor further comprises a converter configured to receive the current signal from the photosensitive element and generate a voltage signal based on the received current signal. The converter may be implemented with the second P-type transistor. Examples of a converter include a logarithmic current-to-voltage converter. The event sensor may also include a first capacitor electrically coupled to the converter in series and configured to receive the voltage signal from the converter. Further, the event sensor may include an amplifier electrically coupled, at an input, to the first capacitor in series and configured to generate, at an output, an amplified signal based on an output signal from the first capacitor. In some embodiments, the photosensitive element may comprise a photodiode.

In some embodiments, the converter and the first capacitor are implemented in the CMOS wafer with the second P-type transistor. Also, the event sensor may further comprise a second capacitor connected in parallel with the first capacitor, the second capacitor being implemented in the CIS wafer and connected to the first capacitor using at least two interconnects. As an example, the second capacitor in combination with the first capacitor increases a capacitance of the amplifier and, in combination with a third capacitor, increases the overall gain of the pixel circuit.

In some embodiments, the gate of the third N-type transistor is connected to the second bias voltage. Also, the pixel circuit may further comprise a fourth, diode-connected N-type transistor at the voltage output.

Embodiments of the present disclosure may further include a pixel circuit for use with an event sensor, the pixel circuit comprising a photosensitive element configured to generate a current signal in response to a brightness of light impinging on the photosensitive element. The pixel circuit may also include a first N-type transistor, a second N-type transistor, a first P-type transistor including a gate connected to a first bias voltage, and a second P-type transistor including a gate connected to a second bias voltage, wherein the second bias voltage is an adjustable DC bias voltage. Also, the pixel circuit may include a voltage output that varies in response to the brightness of light impinging on the photosensitive element. In some embodiments, the second P-type transistor may affect a gain boost, such as a gain boost by a factor of approximately two. In some embodiments, an adjustment of the second bias voltage may cause a DC level of the voltage output to shift up or down without changing an overall gain of the pixel circuit, and the adjustment of the second bias voltage may increase a saturation-free operating range of the pixel circuit and thereby improve a dynamic range of the pixel circuit. Additionally, or alternatively, an adjustment of the second bias voltage (e.g., a DC bias voltage) may increase a saturation-free operating range of the pixel circuit and thereby improve a dynamic range of the pixel circuit. By way of example, the bias voltage may be automatically adjusted responsive to chip temperature and/or statically adjusted according to fabrication process parameter variations. In some embodiments, a temperature sensitive biasing circuit or a biasing circuit configured to sense process parameters may provide an adjustable bias voltage to a pixel circuit. For example, a biasing circuit may comprise a third P-type transistor in series with a third N-type transistor, a programmable current source, and a programmable voltage source. Furthermore, in some embodiments, the third P-type transistor of the biasing circuit may correspond to a P-type transistor of a connected pixel circuit, and/or the third N-type transistor of the biasing circuit may correspond to an N-type transistor of a connected pixel circuit.

As a further example, the pixel circuit may also include a converter configured to receive the current signal from the photosensitive element and generate a voltage signal based on the received current signal. The converter may be implemented with the second P-type transistor. Examples of a converter include a logarithmic current-to-voltage converter. Also, a first capacitor may be provided that is electrically coupled to the converter in series and configured to receive the voltage signal from the converter. In addition, an amplifier may be provided that is electrically coupled, at an input, to the first capacitor in series and configured to generate, at an output, an amplified signal based on an output signal from the first capacitor.

In some embodiments, the pixel circuit further comprises a third N-type transistor including a gate connected to a DC voltage, wherein the third N-type transistor provides leakage compensation at low light levels impinging on the photosensitive element.

It will be understood that the foregoing summary description and the following detailed description are exemplary and explanatory only and are not restrictive of the disclosed embodiments.

BRIEF DESCRIPTION OF THE DRAWINGS

Reference will now be made to the accompanying drawings which illustrate exemplary embodiments of the present disclosure and in which:

FIG. 13 shows an exemplary plot of $V_{pr\_out}$ vs. $I_{ph}$ with controlled $V_{bias\_fes}$ for different process corners. FIG. 14 shows an exemplary plot of $V_{pr\_out}$ vs. $I_{ph}$ with constant $V_{bias\_fes}$ for different process corners. FIG. 15 shows an exemplary plot of $V_{bias\_fes}$ variation for different process corners. FIG. 16 shows an exemplary plot of $V_{pr\_out}$ vs. $I_{ph}$ with controlled $V_{bias\_fes}$ for different settings of $V_{ref}$. FIG. 17 shows an exemplary plot of $V_{pr\_out}$ vs. $I_{ph}$ with constant $V_{bias\_fes}$ for different temperatures. FIG. 18 shows an exemplary plot of $V_{pr\_out}$ vs. $I_{ph}$ with controlled $V_{bias\_fes}$ and $I_{ref}=1$ pA for different temperatures. FIG. 19 shows an exemplary plot of $V_{pr\_out}$ vs. $I_{ph}$ with controlled $V_{bias\_fes}$ and $I_{ref}=100$ pA for different temperatures. FIG. 20 shows an exemplary plot of $V_{bias\_fes}$ variation for different temperatures.

DETAILED DESCRIPTION

Figure 1A:
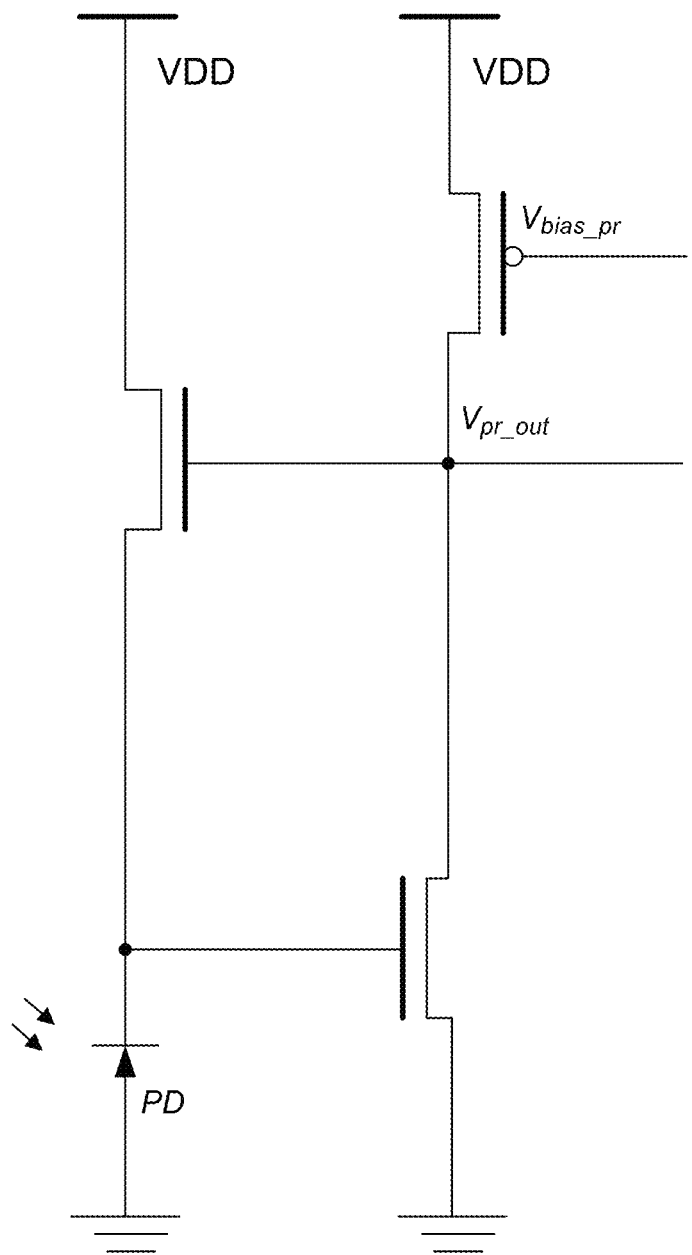
FIG. 1A is an example schematic representation of a conventional pixel circuit.
Figure 1B:
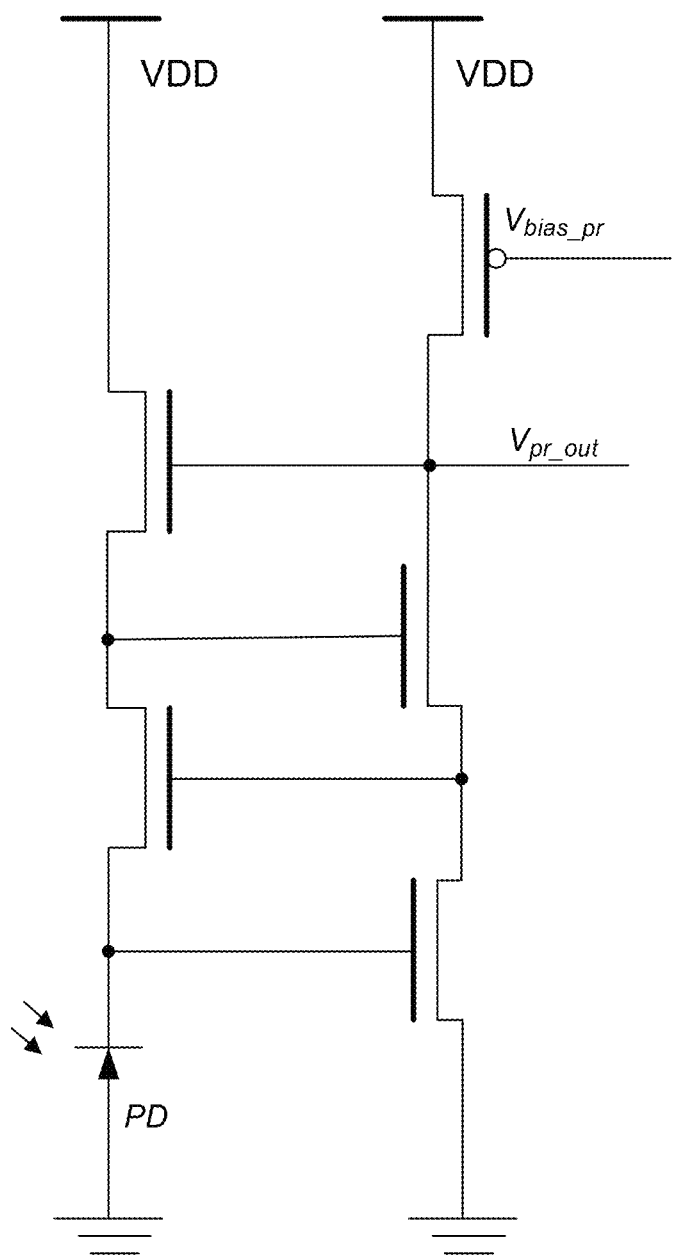
FIG. 1B is another example schematic representation of a conventional pixel circuit.
Figure 1C:
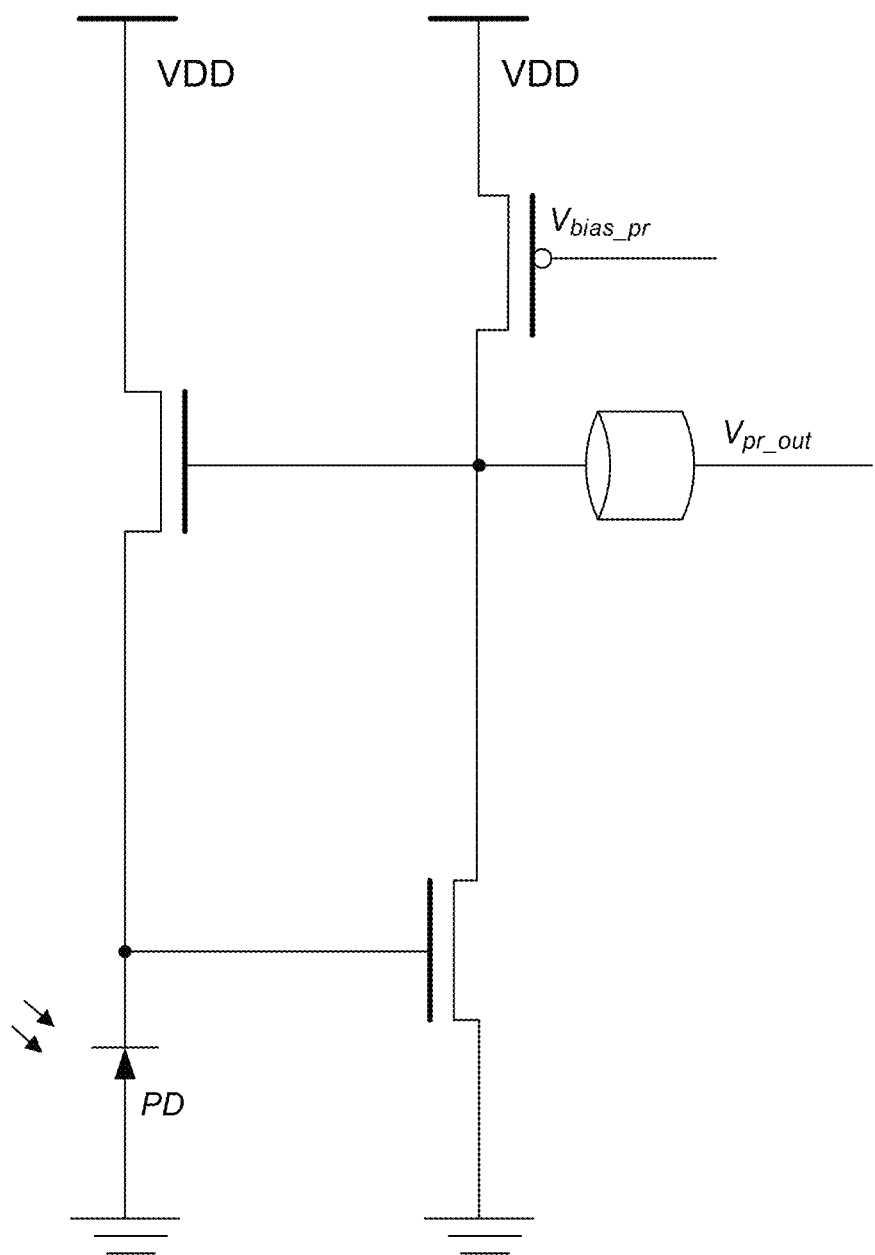
FIG. 1C is an example schematic representation of a conventional stacked pixel circuit.

Reference will now be made in detail to exemplary embodiments and aspects of the present disclosure, examples of which are illustrated in the accompanying drawings. Wherever possible, the same reference numbers will be used throughout the drawings to refer to the same or like parts. The terminology used in the description presented herein is not intended to be interpreted in any limited or restrictive manner simply because it is being utilized in conjunction with a detailed description of certain specific embodiments. Furthermore, the described implementations include several novel features, no single one of which is solely responsible for its desirable attributes or which is essential to the pixel circuits, sensor systems, and arrangements described herein.

The disclosed embodiments relate to improved pixel circuits and architectures for sensing systems and applications, including asynchronous, time-based event sensing. The disclosed embodiments also relate to systems and methods for implementing and using event-based vision sensors with such pixel circuits (referred to as "event sensors" herein). Advantageously, the exemplary embodiments can provide efficient sensing with greater contrast sensitivity and dynamic range. Further advantages of the present embodiments include the ability to optimally use advanced semiconductor fabrication process technologies for implementing a vision sensor with competitive pixel sizes. Still further, as will be appreciated from this disclosure, the embodiments may be implemented and used in various applications and vision systems, such as security systems, autonomous vehicles, and other systems that benefit from rapid and efficient motion or event detection.

In extant image or video processing systems, image sensors may acquire and process visual information in order to reconstruct images. An image or video acquisition and processing system can include an array of photosensors, each of which may acquire visual information to reconstruct an image representation of the visual scene. This process may be repeated at a predetermined rate.

Event-based vision sensors include a plurality of pixel circuits and can pixel-individually detect temporal contrast exceeding a preset relative threshold to follow the temporal evolution of relative light changes (e.g., contrast detection, CD; temporal contrast, TC) and to define sampling points for frame-free pixel-level measurement of absolute intensity (e.g., exposure measurement, EM). Event sensors have gained popularity in high-speed, low-power machine vision applications thanks to temporal precision of recorded data, inherent suppression of temporal redundancy resulting in reduced post-processing cost, and wide intra-scene dynamic range operation. Information about temporal contrast can be encoded in the form of "events": data packets containing the originating pixel's X, Y coordinate, time stamp, and contrast polarity. To maximally benefit from the ability of the individual pixel to sample visual information at high temporal precision, early time-stamping and high readout throughput can be crucial to preserve event timings.

In some embodiments, for real-time artificial vision (also referred to as "computer vision" or "machine vision" herein), a vision acquisition and processing system can be configured to acquire and process only data representing a change of current visual information with respect to previously acquired visual information. Such sensors or vision systems may not generate frames of images. Such visual sensors can include, for example, a temporal contrast (TC) sensor, a contrast detection (CD) sensor, or a dynamic vision sensor (DVS). Such sensors are referred to as "event-based vision sensors" or generally a "event sensor" in this disclosure. Examples of such sensors are described in U.S. Pat. Nos. 8,780,240, 10,721,432, 10,904,465, and 11,317,045, the disclosures of which are fully incorporated herein by reference.

For example, a TC sensor does not record image by frames like extant image systems. Instead, each pixel of the TC sensor can determine a time derivative of the light it senses. In some embodiments, optionally, the pixel can further perform some processing on the time derivative. When the time derivative exceeds a preset threshold value, the pixel can generate an "event" by outputting a signal. With short latency, the pixel can further transmit data related to the event. In some embodiments, the transmitted data can include a location (e.g., x- and y-coordinate) of the pixel located within the TC sensor (e.g., having a two-dimensional pixel matrix). In some embodiments, the transmitted data can include with a sign bit representing polarity (e.g., positive or negative sign) of temporal evolution of light intensity sensed by the pixel. In some embodiments, the transmitted data can include a timestamp of occurrence of the event. In some embodiments, the transmitted data of the pixel can include a flow of (x,y,s) values, in which 'x' and 'y' represent the coordinates of the pixel and 's' represents the polarity. The value of 's' may represent a relative change of the light intensity detected by the pixel, in which the value of 's' can represent the magnitude of the change, and the sign of 's' can represent the direction of the change (e.g., increasing or decreasing). In some embodiments, the pixel circuit of the TC sensor may operate asynchronously in which the pixel circuits of the TC sensor are not typically quantized to a time-base (e.g., not clocked). In other embodiments, the pixel circuit of the TC sensor may operate synchronously, in which the pixel circuits of the TC sensor are quantized to a time-base (e.g., clocked).

As described above, event sensors may include a temporal contrast (TC) sensor, also known as a contrast detection (CD) sensor or a dynamic vision sensor (DVS). Event sensors can be implemented in many different ways, including with or without exposure measurement (EM), and with or without other operations or components, including an analog-to-digital converter (ADC) or digital-to-analog converter (DAC). The number of components can also vary (e.g., one versus multiple EMs), as well as the component location (e.g., in pixel versus external). Furthermore, it is possible for the components to work asynchronously or synchronously, or to have a combination of both. The specific arrangement and types of operations will often depend on the application and requirements of the event sensor.

Embodiments of the present invention provide a pixel circuit and features that can advantageously be used in event-based vision sensors and other sensor systems. By way of example, and without limitation, an event sensor implemented with a TC sensor having a two-dimensional pixel matrix can incorporate embodiments of the present invention and its related features. By way of further example, event sensors using super pixels can incorporate embodiments of the present invention and its related features. It will be appreciated that the following description of sensitivity and dynamic range optimization for event sensor pixels is merely exemplary and other forms of sensors may be utilized with embodiments of the invention. Indeed, as noted above, embodiments of the present invention may be advantageously incorporated into any type of event-based vision sensor or other sensor system.

For implementations of an image sensor, it is beneficial to use modern, wafer stacking technology featuring a minimum distance between the interconnects between the wafers, allowing for the presence of at least one interconnect per pixel. The term, "wafer," as used herein, generally refers to a thin slice of semiconductor used for the fabrication of integrated circuits. Such wafers can be used to fabricate pixel circuits, as described herein. By way of example, a wafer may be a CMOS wafer or a CMOS Image Sensor (CIS) wafer. The term, "interconnect," as used herein, generally refers to an electrical connection (e.g., a conductive bond) between individual wafers. Technologies for implementing interconnects between wafers include, for example, direct metal-to-metal (i.e., Cu—Cu) bonding and "Through-Silicon-Vias" (TSVs). Using direct metal-to-metal bonding technology, an upper wafer is oriented upside down and the upper wafer and a lower wafer are connected "face-to-face" with the interconnect(s) connecting the top metals of both wafers. "Through-Silicon-Vias" (TSVs) can be used to connect two wafers which are not oriented face-to-face (i.e., the back of an upper wafer connects to the front of a lower wafer). TSVs can be used if more than two wafers are stacked. For example, to stack three wafers, a top wafer and a middle wafer may be connected using face-to-face Cu—Cu bonding and the third wafer may be connected underneath the middle wafer using TSVs as the interconnects.

One or more interconnects may be used between wafers of a pixel circuit, as further described herein. With the above technology, it is possible to implement circuit elements of a pixel in stacked configurations, such as vertically stacked arrangements of two or more wafers, and to use different fabrication processes for different wafers. For example, with the phototransduction or photosensitive part residing on the upper wafer and other pixel circuitry residing on the lower wafer, one fabrication technology can be optimized for implementing photosensitive elements while the other fabrication technology is optimized for implementing other electrical components and elements. Such an arrangement helps to minimize pixel size and, at the same time, maximize the overall pixel density of a sensor.

In some embodiments, with a stacked implementation, the minimum interconnect distance (i.e., pitch) is made significantly smaller than the targeted pixel pitch and multiple interconnects can be placed and used in each pixel. Advantageously, multiple in-pixel interconnects may be exploited to achieve optimized pixel gain and contrast sensitivity.

Embodiments of the present disclosure also provide an event sensor with an increased temporal contrast pixel circuit gain, while improving dynamic range, by avoiding pixel front-end saturation, particularly in the presence of temperature and/or fabrication process variations. This is achieved by applying certain circuit design techniques and by exploiting various fabrication technology features, according to the embodiments and aspects described herein.

Circuit design techniques according to the present disclosure include a gain boost mechanism that comprises a DC bias point adjustment capability. For example, in some embodiments, the DC bias point adjustment capability comprises an automated and dynamic adjustment to a bias voltage (e.g., a DC bias voltage) of the pixel circuit responsive to a continuous sensing or determination of a chip temperature. The temperature of the pixel circuit may be determined using a temperature sensitive biasing circuit that is configured to generate a temperature-dependent bias voltage signal that adjusts the bias voltage in response to fluctuations of the chip temperature. In some embodiments, pixel circuits or event sensors comprising a stacked wafer technology (i.e., two or more wafers) include a temperature sensitive biasing circuit placed on a bottom wafer (e.g., CMOS wafer). In other embodiments comprising stacked wafer technology, the biasing circuit may be placed on a top wafer (e.g., CIS wafer). In yet other embodiments comprising stacked wafer technology, the biasing circuit may be placed on both a top wafer and a bottom wafer, or alternatively, the biasing circuit may be a shared biasing circuit that spans both a top wafer and a bottom wafer.

Additionally, or alternatively, the DC bias point adjustment capability may include a static adjustment to the bias voltage to compensate for the effects of fabrication process parameters (e.g., a global threshold voltage) varying from chip to chip. The static type of bias voltage adjustment may be implemented using a biasing circuit that is configured to sense the process parameters of the chip or wafer of the pixel circuit and provide a compensation voltage signal which is applied to correct or adjust the bias voltage. As disclosed herein, adjustment of the bias voltage may prevent saturation and improve a dynamic range of the pixel circuit. In some embodiments, pixel circuits or event sensors comprising a stacked wafer technology (i.e., two or more wafers) include a biasing circuit placed on a bottom wafer (e.g., CMOS wafer). In other embodiments comprising stacked wafer technology, a biasing circuit may be placed on a top wafer (e.g., CIS wafer). In yet other embodiments comprising stacked wafer technology, a biasing circuit may be placed on both a top wafer and a bottom wafer, or alternatively, the biasing circuit may be a shared biasing circuit that spans both a top wafer and a bottom wafer.

As a further alternative, the DC bias point adjustment capability may include an automated and dynamic adjustment to a bias voltage (e.g., a DC bias voltage) of the pixel circuit responsive to a continuous determination of a chip temperature and a static adjustment to the bias voltage to compensate for the effects of fabrication process parameters varying from chip to chip. The temperature of the pixel circuit may be sensed using an on-chip temperature sensitive biasing circuit that is configured to generate a temperature-dependent bias voltage signal that adjusts the bias voltage in response to fluctuations of the chip temperature. The static type of bias voltage adjustment may be implemented using the same biasing circuit which is further configured to sense the process parameters of the chip or wafer of the pixel circuit and provide a compensation voltage signal which is applied to further correct or adjust the bias voltage. As disclosed herein, adjustment of the bias voltage may prevent saturation and improve a dynamic range of the pixel circuit. In some embodiments of pixel circuits or event sensors comprising a stacked wafer technology (i.e., two or more wafers), a biasing circuit may be placed on a bottom wafer (e.g., CMOS wafer). In other embodiments comprising stacked wafer technology, a biasing circuit may be placed on a top wafer (e.g., CIS wafer). In yet other embodiments comprising stacked wafer technology, a biasing circuit may be placed on both a top wafer and a bottom wafer, or alternatively, the biasing circuit may be a shared biasing circuit that spans both a top wafer and a bottom wafer.

The benefits associated with the bias point adjustment capability are independent of whether a stacked or non-stacked configuration is utilized. However, in some embodiments, further benefits can be achieved with stacked configurations. For example, in a 3D stacked implementation, the pixel circuit performance is even further improved. In addition to any DC bias point adjustment capability, with the disclosed stacked implementations, the performance can be improved by using multiple interconnects per pixel to optimally distribute the circuit components between the different wafers. These and other features are described herein with reference to the illustrated example embodiments.

FIGS. 2A-2D provide example schematic representations of a pixel circuit 100, consistent with embodiments of the present disclosure. The pixel circuit 100 may be implemented in a non-stacked configuration (e.g., FIG. 2A) or stacked configuration (e.g., FIGS. 2B, 2C, and 2D). Further, as disclosed herein, the pixel circuit 100 may be used to implement an event-based vision sensor or similar vision system. According to these embodiments, the pixel circuit 100 can provide several advantages, including improved gain-boost properties and an automatic adjustment capability of the bias voltage.

In FIGS. 2A-2D, the pixel circuit 100 includes a photosensitive element 101 configured to generate a current signal in response to a brightness of light impinging on the photosensitive element 101. The pixel circuit 100 also includes a first N-type transistor 107, a second N-type transistor 108, a first P-type transistor 110 with its gate connected to a first bias voltage ("bias_pr") 103, and a second P-type transistor 102 (e.g., a PMOS transistor) with its gate connected to a second bias voltage ("bias_fes") 104. The second bias voltage 104 may be an adjustable DC bias voltage. For example, the second bias voltage may be automatically adjusted according to temperature and/or statically adjusted according to fabrication process variation.

By way of example, the second bias voltage may be a DC bias voltage that is automatically adjusted responsive to fluctuations of a chip temperature. In some embodiments, an on-chip temperature sensitive biasing circuit may be used to continuously sense the chip temperature of the pixel circuit and automatically adjust the bias voltage (e.g., the second bias voltage of the pixel circuit) in response to the chip temperature. As another example, the bias voltage may be statically adjusted (e.g., at one time or before use of the pixel circuit) to address fabrication process variations (e.g., a global threshold voltage) and prevent saturation and/or improve a dynamic range of the pixel circuit. For example, in some embodiments, a biasing circuit may be used that is configured to sense the process parameters of the chip or wafer of the pixel circuit and adjust the bias voltage. The static type of bias voltage adjustment may provide compensation for the effects of process parameters varying from chip to chip. According to yet another example, the bias voltage may be automatically and dynamically adjusted in response to a continuous sensing or determination of a chip temperature as well as statically adjusted to compensate for the effects of fabrication process parameters varying from chip to chip. Therefore, in some embodiments, a biasing circuit may be used that is configured to continuously sense the chip temperature of the pixel circuit and automatically adjust the bias voltage in response to the chip temperature and to sense the process parameters of the chip or wafer of the pixel circuit and further adjust the bias voltage. As disclosed herein, a compensation voltage signal may be generated by the biasing circuit and applied to adjust the bias voltage (e.g., the second bias voltage of the pixel circuit).

The first N-type transistor 107 may have a first terminal (e.g., source) connected to a first terminal (e.g., source) of the second P-type transistor 102. The first N-type transistor 107 may have a second terminal (e.g., drain) connected to a drain power voltage (VDD). The second N-type transistor 108 may have a first terminal (e.g., drain) connected to the gate of the first N-type transistor 107. The second N-type transistor 108 may have a second terminal (e.g., source) connected to the ground. The second N-type transistor 108 may have its gate connected to a second terminal (e.g., drain) of the second P-type transistor 102 and to the photosensitive element 101.

Figure 2A:
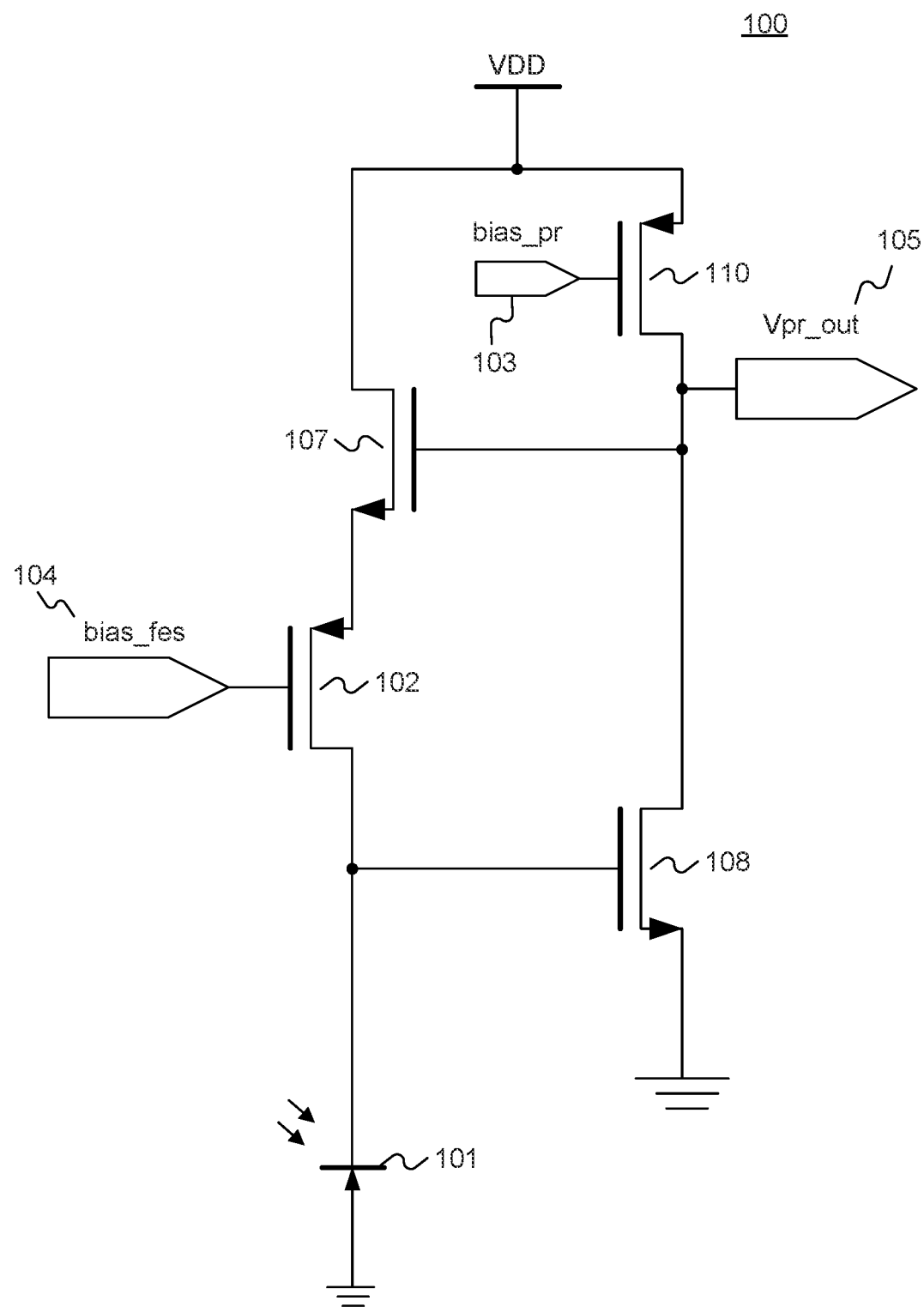
FIG. 2A is an example schematic representation of a non-stacked pixel circuit, according to embodiments of the present disclosure.
Figure 2B:
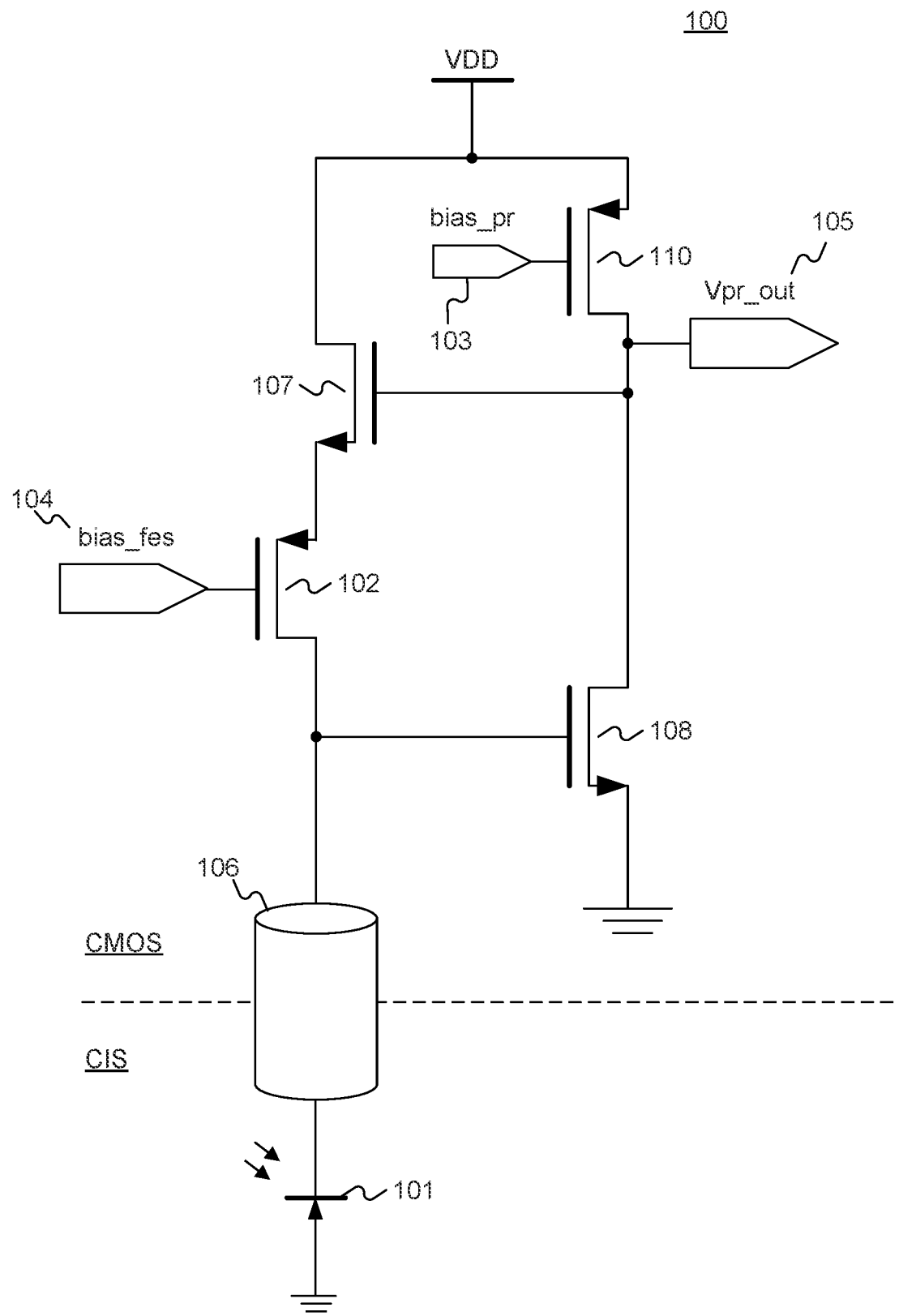
FIG. 2B is an example schematic representation of a stacked pixel circuit, according to embodiments of the present disclosure.
Figure 2C:
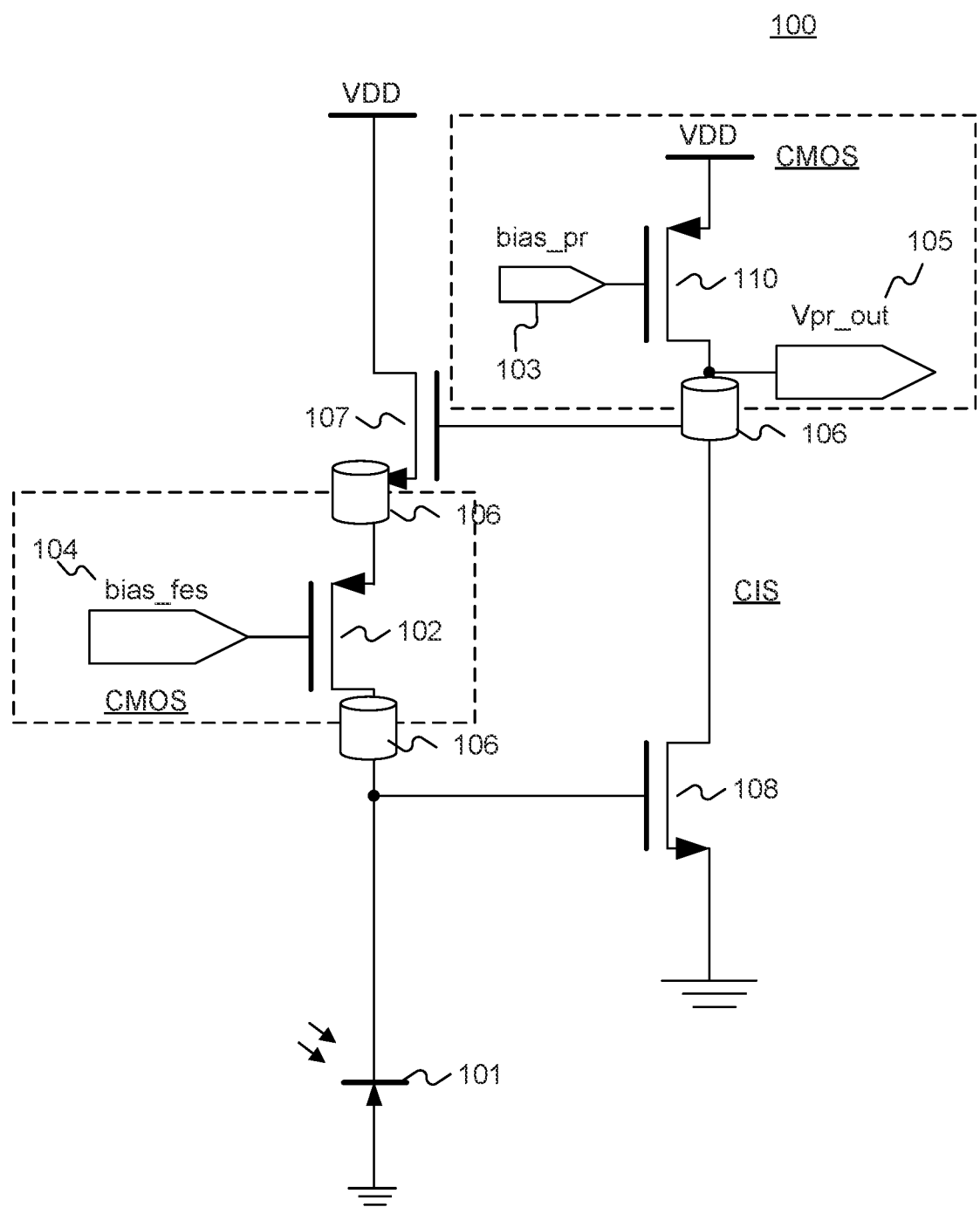
FIG. 2C is an example schematic representation of another stacked pixel circuit, according to embodiments of the present disclosure.
Figure 2D:
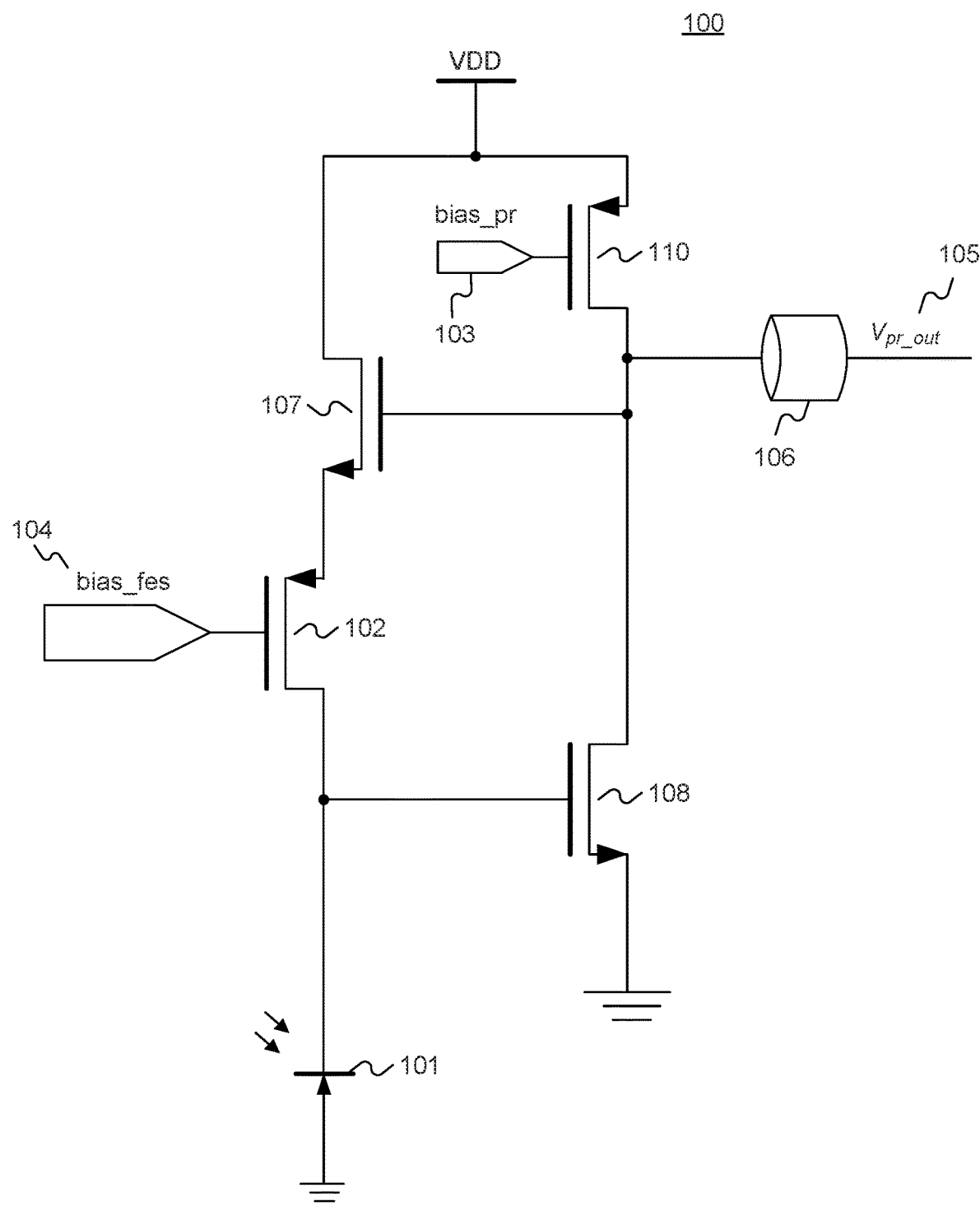
FIG. 2D is an example schematic representation of yet another stacked pixel circuit, according to embodiments of the present disclosure.

As further shown in FIGS. 2A-2D, the pixel circuit 100 includes a voltage output ("$V_{pr\_out}$") 105 that varies in response to the brightness of light impinging on the photosensitive element 101 (i.e., illuminance). When implemented in a stacked configuration, the pixel circuit 100 may also include one or more interconnects 106 between the wafers, as illustrated in FIGS. 2B-2D and described elsewhere in this disclosure. For example, depending on the number and arrangement of circuit components, there may be interconnect(s) between a top wafer and a bottom wafer. The top wafer (including, e.g., photosensitive element 101) may be fabricated using a specialized CMOS Image Sensor (CIS) semiconductor fabrication process, while the bottom wafer (including, e.g., the other components of pixel circuit 100) may be fabricated using a high-performance analog CMOS semiconductor fabrication process. In other embodiments, both the top and bottom wafers are CMOS wafers. FIG. 2B illustrates an exemplary pixel circuit wherein photosensitive element 101 is implemented on a top wafer, and wherein other components of the pixel circuit are implemented on a bottom wafer. FIG. 2C illustrates another exemplary pixel circuit wherein photosensitive element 101, first N-type transistor 107, and second N-type transistor 108 are implemented on a top wafer, and wherein other components of the pixel circuit are implemented on a bottom wafer. In the example shown in FIG. 2C, the top wafer is a CIS wafer, and the bottom wafer is a CMOS wafer, wherein interconnects 106 provide electrical connections between the top and bottom wafers. FIG. 2D illustrates an exemplary pixel circuit wherein photosensitive element 101, first P-type transistor 110 with its gate connected to a first bias voltage ("bias_pr") 103, second P-type transistor 102 with its gate connected to a second bias voltage ("bias_fes") 104, first N-type transistor 107, and second N-type transistor 108 are implemented on a top wafer, and wherein other components (e.g., an output voltage 105) is implemented on a bottom wafer. In the example shown in FIG. 2D, an interconnect 106 provides electrical connections between top and bottom wafers. As will be appreciated from this disclosure, other configurations are possible and FIGS. 2A-2D provide non-limiting examples.

Figure 9:
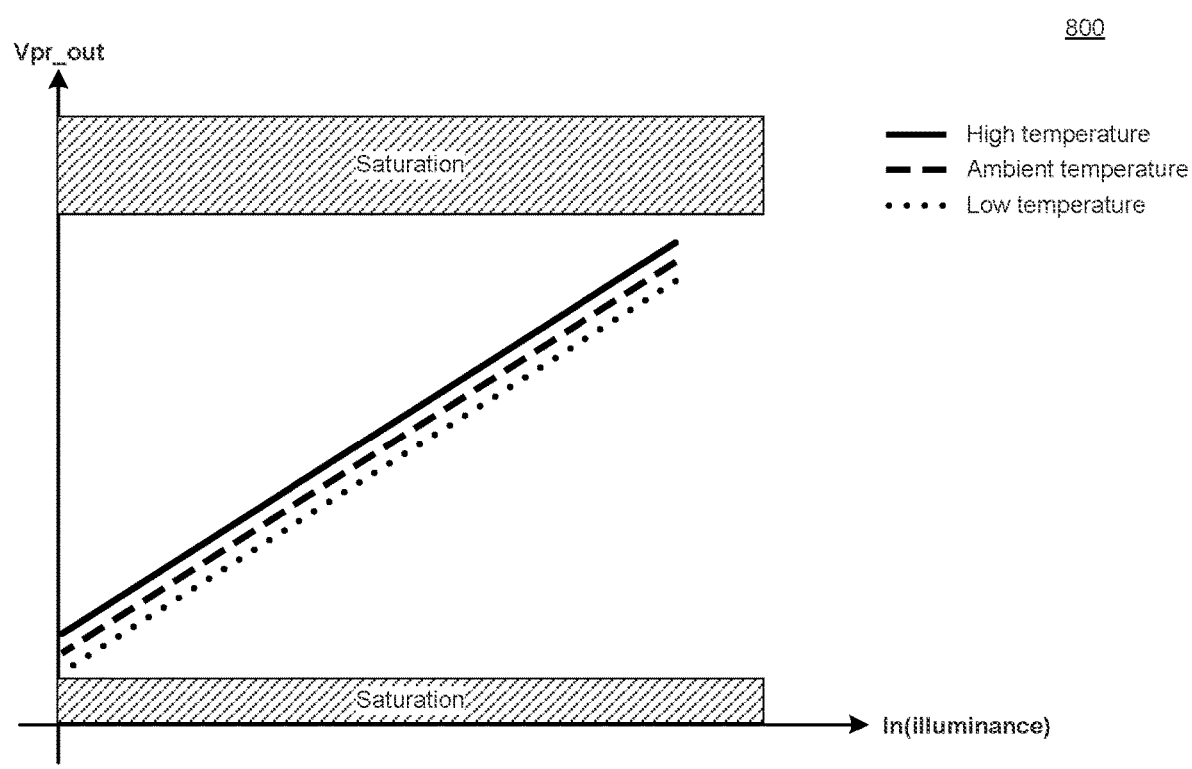
FIG. 9 is an example graphical representation of the output voltage versus the illuminance for a pixel circuit, according to embodiments of the present disclosure.
Figure 10:
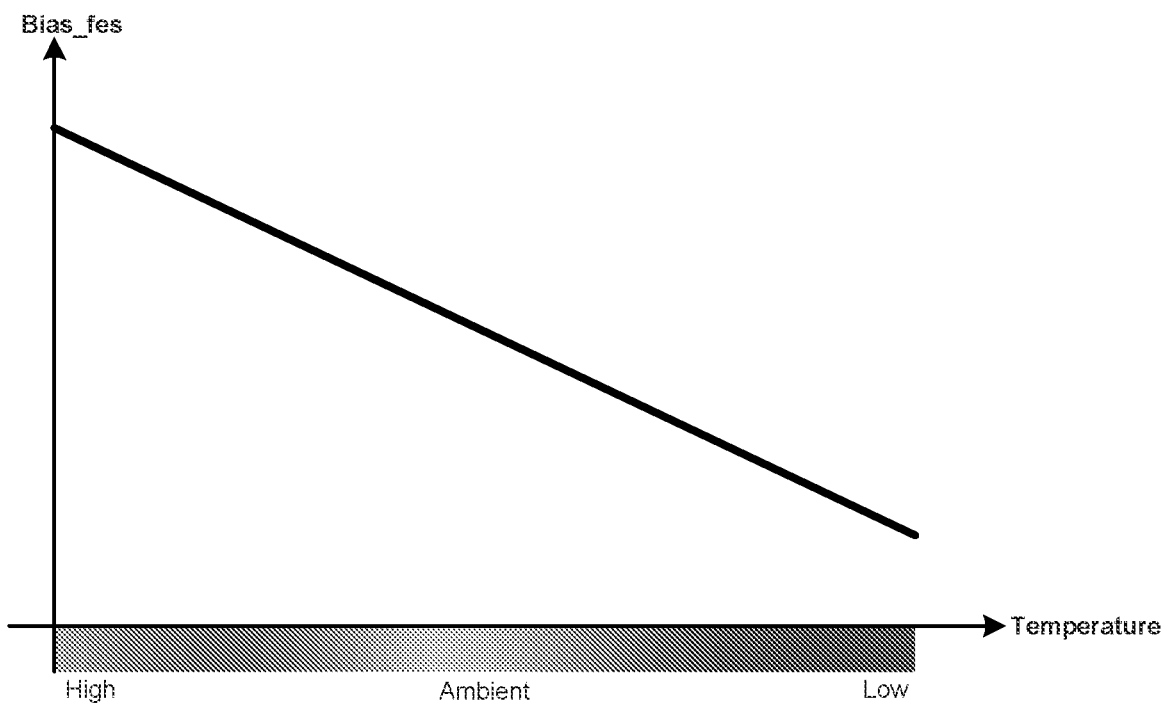
FIG. 10 is an example graphical representation of the bias voltage as a function of temperature for a pixel circuit, according to embodiments of the present disclosure.

In the example pixel circuit embodiments of FIGS. 2A-2D, the second P-type transistor 102 affects a gain boost by a factor of approximately two (e.g., a range of 1.5 to 2.5). Further, an adjustment of the second bias voltage 104 causes a DC level of the voltage output 105 to shift up or down without changing the overall gain of the pixel circuit 100. For example, the adjustment of the second bias voltage 104 allows for shifting of the output voltage potential based on variations in temperature and/or fabrication processes, thereby preventing an entry of the pixel circuit into a lower and upper saturation areas. For example, as illustrated in FIG. 9, the shift of the output voltage ("$V_{pr\_out}$") 105 versus illuminance ("In") curve over temperature is made arbitrarily small when adjusting the second bias voltage ("bias_fes") 104 as a function of the temperature. The latter adjustment is shown in FIG. 10.

Figure 3A:
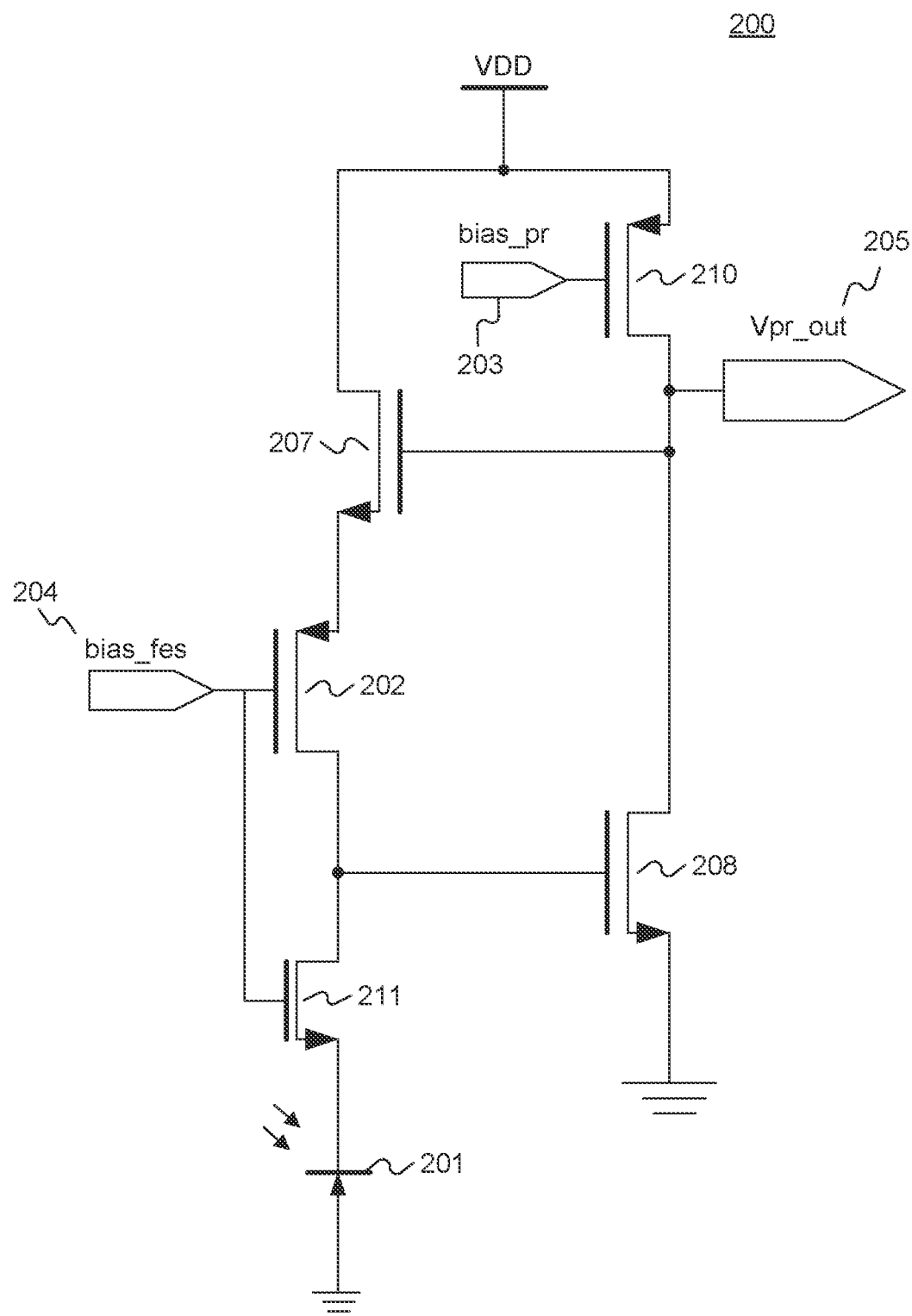
FIG. 3A is an example schematic representation of another non-stacked pixel circuit, according to embodiments of the present disclosure.
Figure 3B:
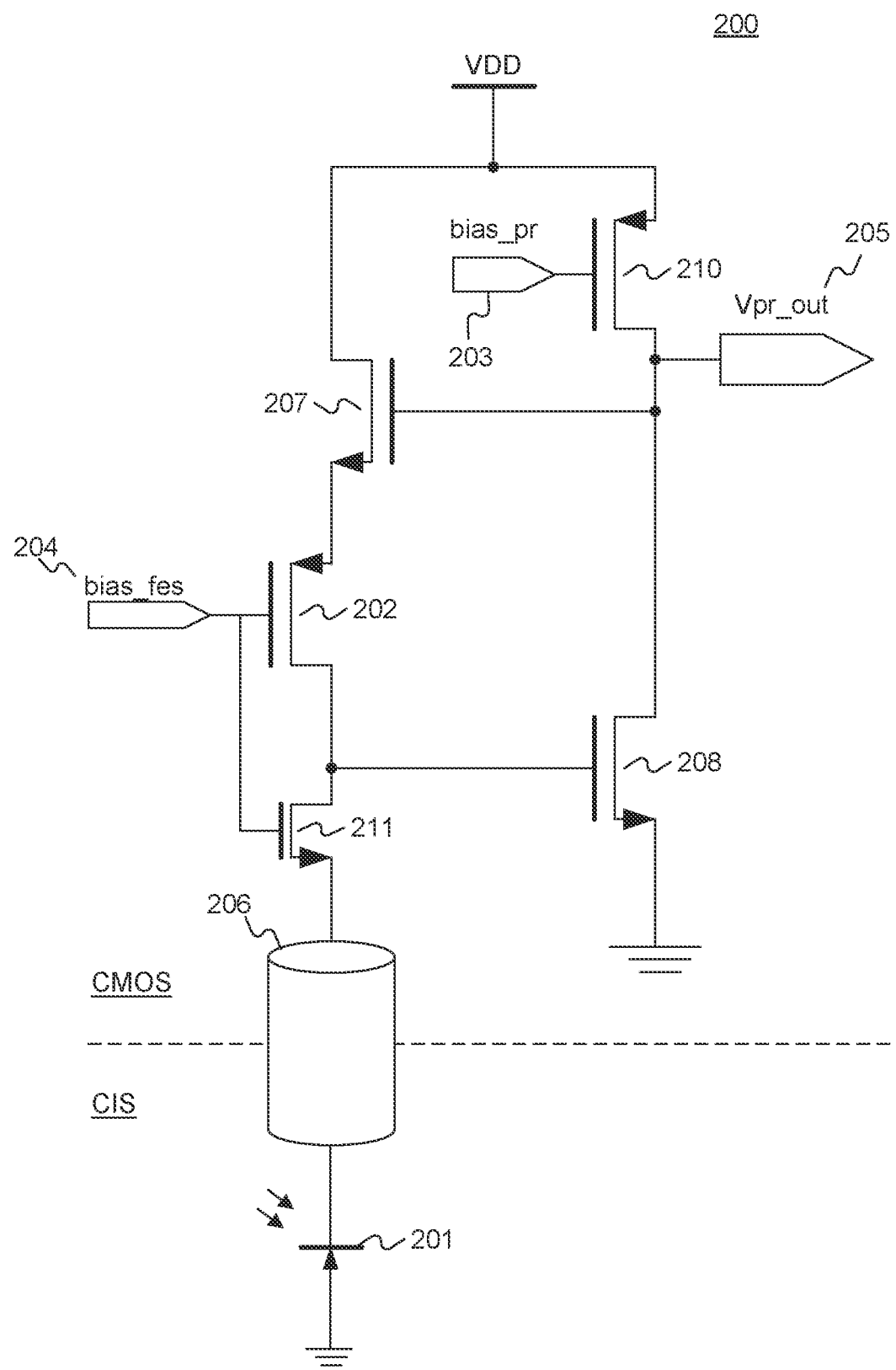
FIG. 3B is an example schematic representation of a stacked pixel circuit, according to embodiments of the present disclosure.

FIGS. 3A-3B provide example schematic representations of another pixel circuit 200, consistent with embodiments of the present disclosure. The pixel circuit 200 may be implemented in a non-stacked configuration (e.g., FIG. 3A) or a stacked configuration (e.g., FIG. 3B). The pixel circuit 200 may be used to implement an event-based vision sensor or similar vision system, as described herein.

The pixel circuit 200 includes a photosensitive element 201 configured to generate a current signal in response to a brightness of light impinging on the photosensitive element 201. The pixel circuit also includes a first N-type transistor 207, a second N-type transistor 208, a first P-type transistor 210 with its gate connected to a first bias voltage ("bias_pr") 203, and a second P-type transistor 202 (e.g., a PMOS transistor) with its gate connected to a second bias voltage ("bias_fes") 204. The second bias voltage 204 may be an adjustable DC bias voltage. For example, the second bias voltage may be automatically adjusted according to temperature and/or statically adjusted according to fabrication process variation. To adjust the second bias voltage, the same techniques described above to adjust the second bias voltage of FIGS. 2A-2D may be implemented to adjust the second bias voltage of FIGS. 3A-3B. The pixel circuit 200 of FIGS. 3A-3B also includes a voltage output ("$V_{pr\_out}$") 205 that varies in response to the brightness of light impinging on the photosensitive element 201. Still further, in comparison to the pixel circuit 100 of FIGS. 2A-2B, the pixel circuit 200 of FIGS. 3A-3B includes a third N-type transistor 211 (e.g., an NMOS transistor) with its gate connected to a DC voltage. In the examples of FIGS. 3A-3B, the gate of the third N-type transistor 211 is shown as being connected to the second bias voltage 204. However, it will be appreciated from this disclosure that the gate of transistor 211 may be connected to another DC voltage source. In the embodiments of FIGS. 3A-3B, the third N-type transistor 211 provides the advantage of leakage compensation at low light levels impinging on the photosensitive element 201. This leakage compensation allows for better control and linearization of the gain boost from the second P-type transistor 202 at low light levels.

As shown in FIG. 3B, the pixel circuit 200 may be arranged in a stacked configuration. When implemented in a stacked configuration, the pixel circuit 200 may include one or more interconnects 206 between the wafers. For example, depending on the number and arrangement of circuit components, there may be interconnect(s) between a top wafer and a bottom wafer. The top wafer (including, e.g., photosensitive element 201) may be fabricated using a specialized CMOS Image Sensor (CIS) semiconductor fabrication process, while the bottom wafer (including, e.g., the other components of the pixel circuit 200) may be fabricated using a high-performance analog CMOS semiconductor fabrication process. In other embodiments, both the top and bottom wafers are CMOS wafers. As will be appreciated from this disclosure, other configurations are possible and FIGS. 3A-3B provide non-limiting examples.

In some embodiments of the pixel circuit 200, the second P-type transistor 202, the third N-type transistor 211, and one or more other components of the pixel circuit 200 are implemented in a common wafer (e.g., a CMOS wafer) and in a non-stacked configuration.

Figure 4A:
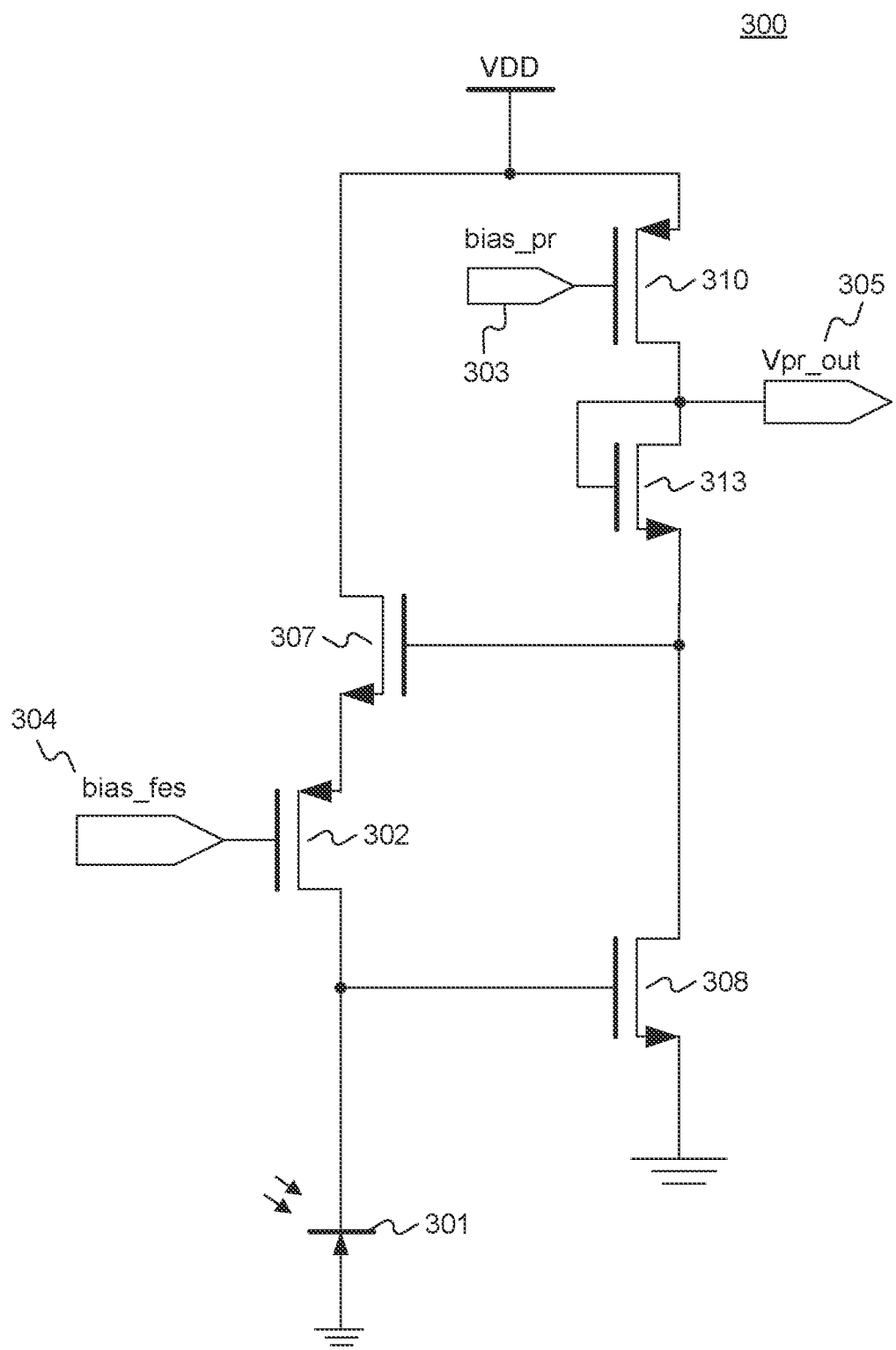
FIG. 4A is an example schematic representation of a further non-stacked pixel circuit, according to embodiments of the present disclosure.
Figure 4B:
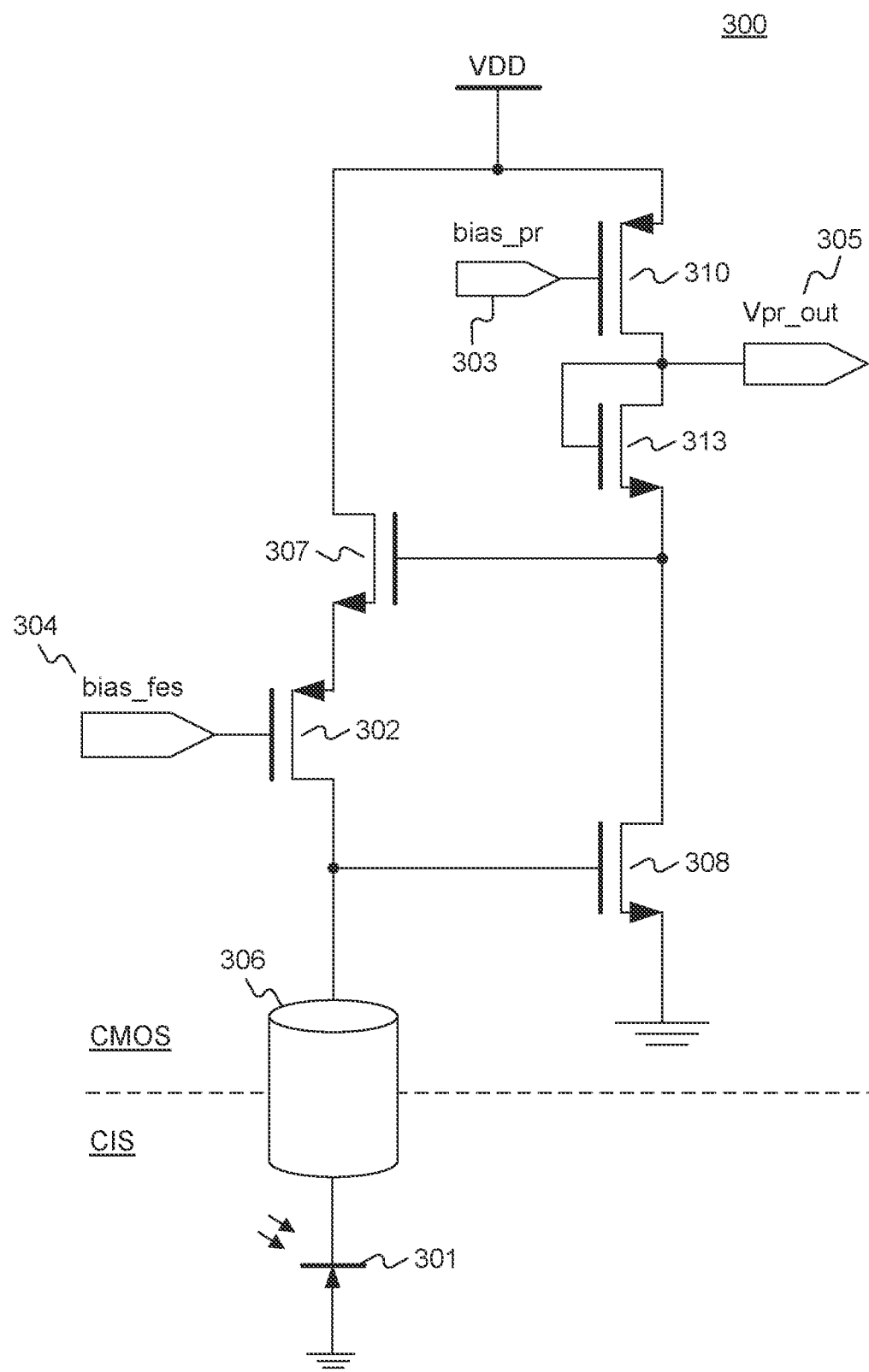
FIG. 4B is an example schematic representation of a further stacked pixel circuit, according to embodiments of the present disclosure.

FIGS. 4A-4B provide example schematic representations of yet another pixel circuit 300, according to embodiments of the present disclosure. The embodiments of FIGS. 4A-4B may be implemented in a non-stacked configuration (e.g., FIG. 4A) or a stacked configuration (e.g., FIG. 4B) configuration. Further, the pixel circuit 300 of FIGS. 4A-4B may be used to implement an event-based vision sensor or similar vision system, as described herein.

The pixel circuit 300 of FIGS. 4A-4B includes a photosensitive element 301 configured to generate a current signal in response to a brightness of light impinging on the photosensitive element 301, a first N-type transistor 307, a second N-type transistor 308, a first P-type transistor 310 with its gate connected to a first bias voltage ("bias_pr") 303, and a second P-type transistor 302 (i.e., a PMOS transistor) including a gate connected to a bias voltage ("bias_fes") 304. In some embodiments, the second bias voltage 304 is an adjustable DC bias voltage. For example, the second bias voltage may be automatically adjusted according to temperature and/or statically adjusted according to fabrication process variation. To adjust the second bias voltage, the same techniques described above to adjust the second bias voltage of FIGS. 2A-2D may be implemented to adjust the second bias voltage of FIGS. 4A-4B. The pixel circuit 300 also includes a voltage output ("Vpr_out") 305 that varies in response to the brightness of light impinging on the photosensitive element 301, and a diode-connected N-type transistor 313 (e.g., an NMOS transistor) at the output voltage 305. In the embodiments of FIGS. 4A-4B, the diode-connected N-type transistor 313 at the output voltage 305 allows for compensation of the body effect thereby improving the gain of any following stage receiving the voltage output 305.

As further shown in FIG. 4B, the pixel circuit 300 may be arranged in a stacked configuration. When implemented in a stacked configuration, the pixel circuit 300 may include one or more interconnects 306 between the wafers. For example, depending on the number and arrangement of circuit components, there may be interconnect(s) between a top wafer and a bottom wafer. The top wafer (including, e.g., photosensitive element 301) may be fabricated using a specialized CMOS Image Sensor (CIS) semiconductor fabrication process, while the bottom wafer (including, e.g., the other components of the pixel circuit 300) may be fabricated using a high-performance analog CMOS semiconductor fabrication process. In other embodiments, both the top and bottom wafers are CMOS wafers. As will be appreciated from this disclosure, other configurations are possible and FIGS. 4A-4B provide non-limiting examples.

In some embodiments of the pixel circuit 300, the second P-type transistor 302, the diode-connected N-type transistor 311 at the output voltage 305, and one or more other components of the pixel circuit 300 are implemented in a common wafer and in a non-stacked configuration.

Figure 5A:
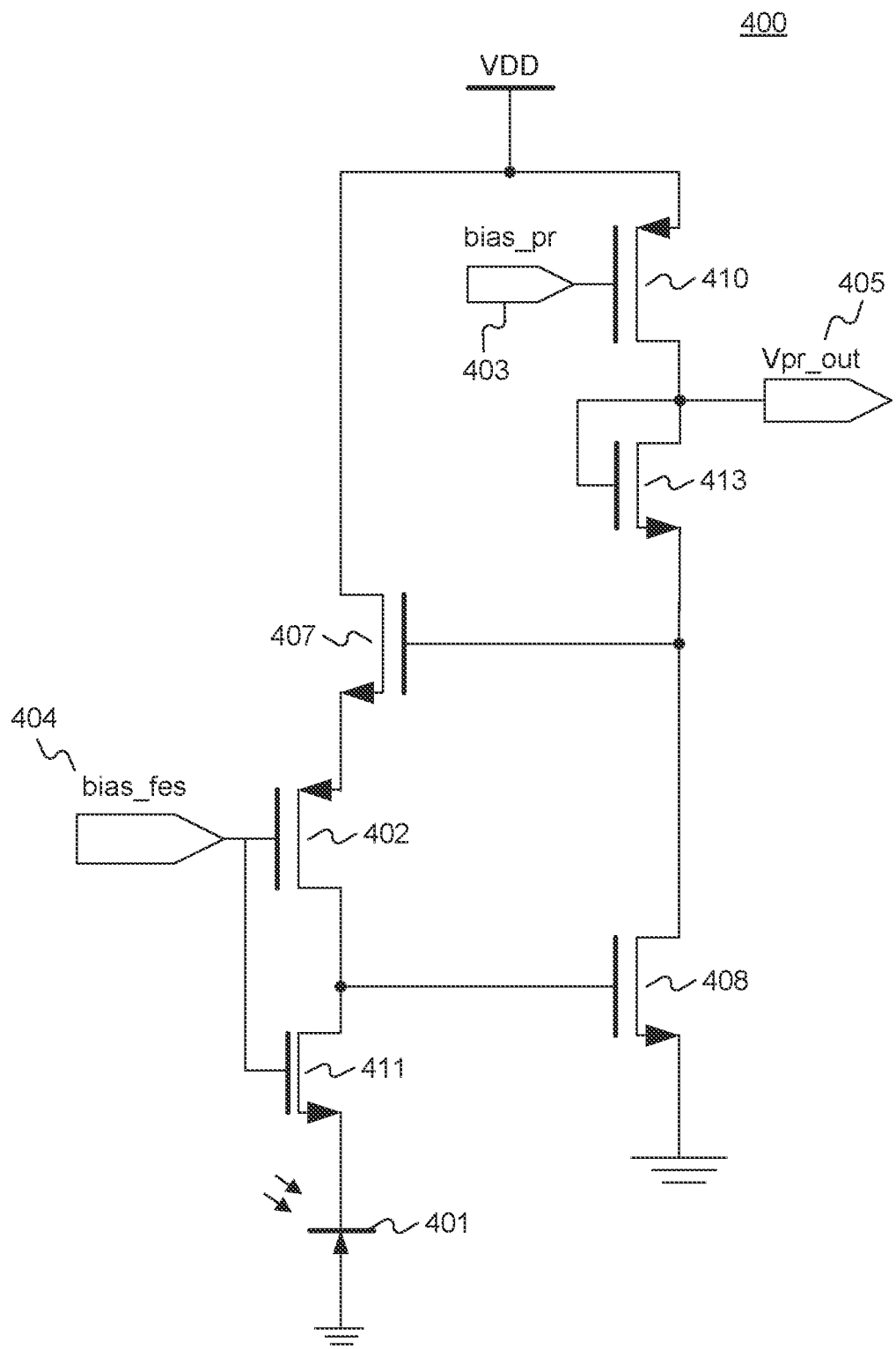
FIG. 5A is an example schematic representation of yet another non-stacked pixel circuit, according to embodiments of the present disclosure.
Figure 5B:
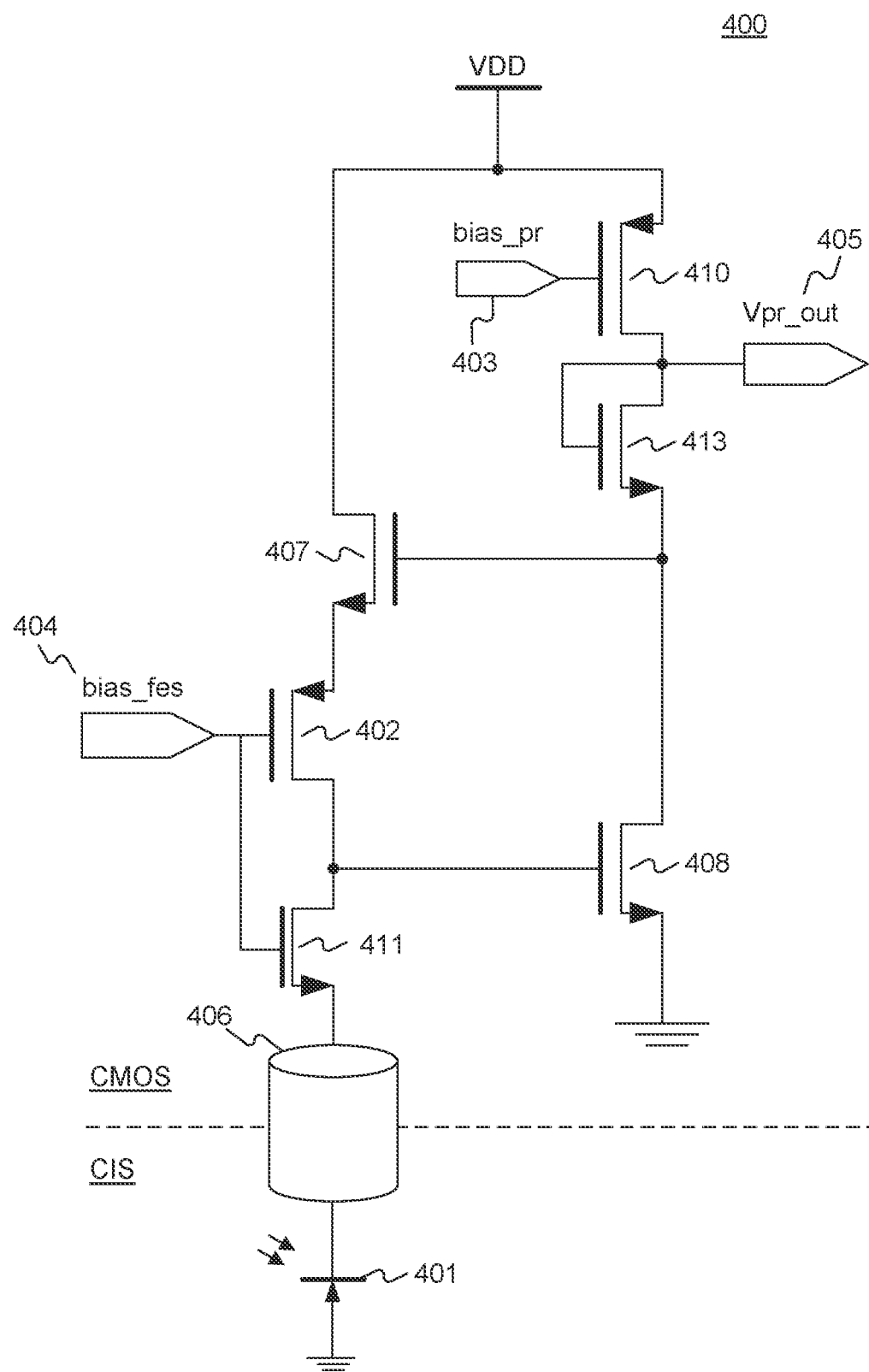
FIG. 5B is an example schematic representation of yet another a stacked pixel circuit, according to embodiments of the present disclosure.

FIGS. 5A-5B provide example schematic representations of another pixel circuit 400, according to embodiments of the present disclosure. The pixel circuit 400 of FIGS. 5A-5B may be implemented in various configurations depending on the vision system and application (e.g., an event-based vision sensor or otherwise). In some embodiments, the pixel circuit 400 is implemented as a non-stacked configuration (e.g., FIG. 5A) or a stacked configuration (e.g., FIG. 5B). Other configurations are possible and it will be appreciated that FIGS. 5A-5B provide non-limiting examples.

The pixel circuit 400 includes a photosensitive element 401 configured to generate a current signal in response to a brightness of light impinging on the photosensitive element 401, a first N-type transistor 407, a second N-type transistor 408, a first P-type transistor 410 with its gate connected to a first bias voltage ("bias_pr") 403, and a P-type transistor 402 (e.g., a PMOS transistor) with its gate connected to a bias voltage ("bias_fes") 404. By way of example, the bias voltage 404 is an adjustable DC bias voltage. For example, the second bias voltage may be automatically adjusted according to temperature and/or statically adjusted according to fabrication process variation. To adjust the second bias voltage, the same techniques described above to adjust the second bias voltage of FIGS. 2A-2D may be implemented to adjust the second bias voltage of FIGS. 5A-5B.

As further shown in FIGS. 5A-5B, the first N-type transistor 407 may have its gate connected to a first terminal (e.g., drain) of the second N-type transistor 408. The second N-type transistor 408 may have a second terminal (e.g., source) connected to the ground. The second N-type transistor 408 may have its gate connected to a first terminal (e.g., drain) of the second P-type transistor 402 and to a first terminal (e.g., drain) of the third N-type transistor 411. The first N-type transistor 407 may have a first terminal (e.g., source) connected to a second terminal (e.g., source) of the second P-type transistor 402, and the first N-type transistor 407 may have a second terminal (e.g., drain) connected to a drain power voltage (VDD).

The pixel circuit 400 also includes a voltage output ("$V_{pr\_out}$") 405 that varies in response to the brightness of light impinging on the photosensitive element 401, a third N-type transistor 411 (e.g., an NMOS transistor) with its gate connected to a DC voltage (e.g., bias voltage 404), and an additional diode-connected N-type transistor 413 at the output voltage 404. In the embodiments of FIGS. 5A-5B, the third N-type transistor 411 provides leakage compensation at low light levels impinging on the photosensitive element 401. This leakage compensation allows for better control and linearization of the gain boost from the second P-type transistor 402 at low light levels. In addition, the diode-connected N-type transistor 413 at the output voltage 405 allows for compensation of the body effect, thereby improving the gain of any following stage receiving the voltage output 405.

As further shown in FIG. 5B, the pixel circuit 400 may be arranged in a stacked configuration. When implemented in a stacked configuration, the pixel circuit 400 may include one or more interconnects 406 between the wafers. For example, depending on the number and arrangement of circuit components, there may be interconnect(s) between a top wafer and a bottom wafer. The top wafer (including, e.g., photosensitive element 401) may be fabricated using a specialized CMOS Image Sensor (CIS) semiconductor fabrication process, while the bottom wafer (including, e.g., the other components of the pixel circuit 400) may be fabricated using a high-performance analog CMOS semiconductor fabrication process. In other embodiments, both the top and bottom wafers are CMOS wafers. As will be appreciated from this disclosure, other configurations are possible and FIGS. 5A-5B provide non-limiting examples.

In some embodiments of the pixel circuit 400, the third N-type transistor 411 is implemented in a common wafer with the second P-type transistor 402 and optionally any additional N-type transistors (such as transistors 407, 408, 413), and/or photosensitive element 401. In some embodiments of the pixel circuit 400, the first N-type transistor 407, the second N-type transistor 408, the third N-type transistor 411, the diode-connected N-type transistor 413 at the output voltage 405, and the photosensitive element 401 are implemented on a common wafer. In some embodiments of the pixel circuit 400, the second P-type transistor 402 and one or more of the N-type transistors 407, 408, 413 and/or photosensitive element 401 are implemented in a common wafer and in a non-stacked configuration. By way of example, the common wafer may be a first CMOS wafer or a CMOS Image Sensor (CIS) wafer. In some embodiments, the photosensitive element 401 of the pixel circuit 400 is implemented in a second CMOS wafer, and the first CMOS wafer is stacked relative to the second CMOS wafer. In some embodiments, the second P-type transistor 402 is implemented in a CMOS wafer, and the CMOS wafer is stacked relative to another CMOS wafer or relative to a CIS wafer.

As previously discussed, one or more interconnects may be provided between wafers. For example, with reference to the embodiments of pixel circuits 400, at least one in-pixel interconnect 406 may be provided between a first CMOS wafer and a second CMOS wafer. In some embodiments, there is more than one in-pixel interconnect 406 between a first CMOS wafer and a second CMOS wafer. Alternatively, or additionally, a plurality of interconnects 406 may be provided between a first CMOS wafer and a second CMOS wafer. Other configurations with interconnects are possible and within the scope of the present disclosure.

Figure 6A:
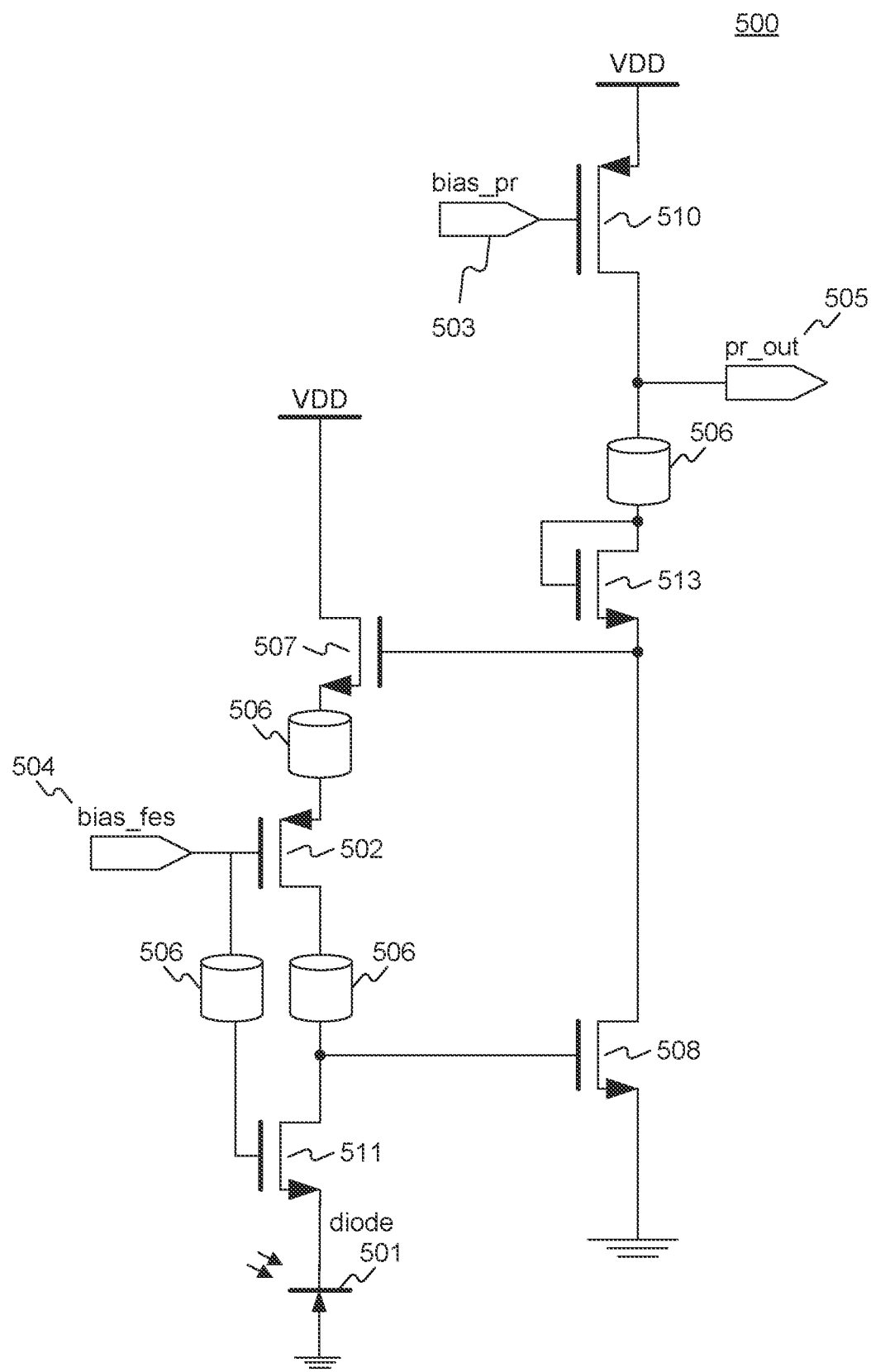
FIG. 6A is an example schematic representation of another pixel circuit, according to embodiments of the present disclosure.
Figure 6B:
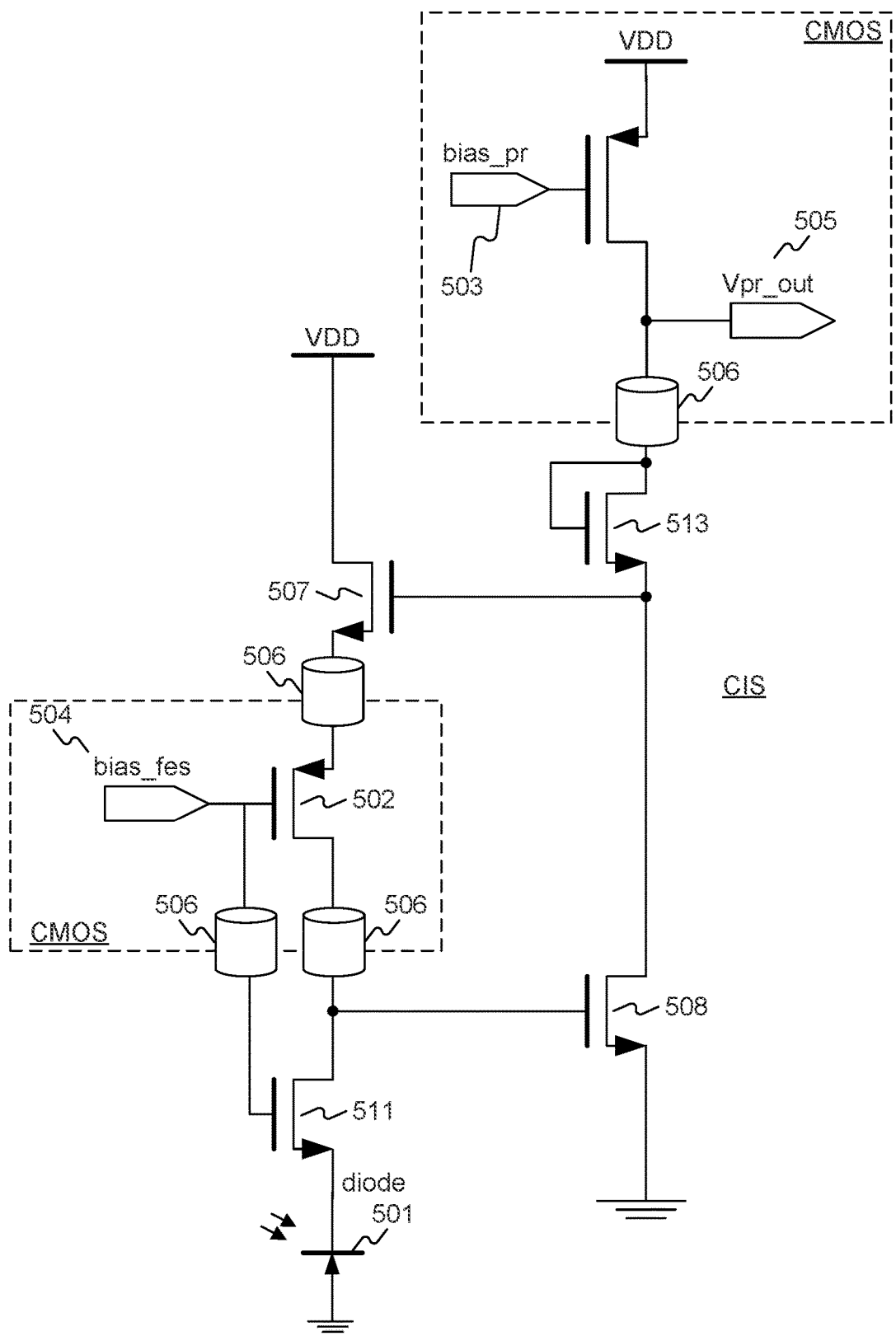
FIG. 6B is an example schematic representation of another pixel circuit with a stack configuration and illustration of the arrangement of the components related to the different wafers, according to embodiments of the present disclosure.

FIGS. 6A-6B provide example schematic representations of still another pixel circuit 500, according to embodiments of the present disclosure. The pixel circuit 500 of FIGS. 6A-6B may be implemented in various configurations depending on the vision system and application (e.g., an event-based vision sensor or otherwise). In the illustrated embodiments of FIGS. 6A-6B, the pixel circuit 500 is implemented in a stacked configuration with interconnects 506, as further described below.

The pixel circuit 500 includes a photosensitive element 501 configured to generate a current signal in response to a brightness of light impinging on the photosensitive element 501 (e.g., a photodiode), a first N-type transistor 507, a second N-type transistor 508, a first P-type transistor 510 with its gate connected to a first bias voltage ("bias_pr") 503, and a second P-type transistor 502 (e.g., a PMOS transistor) with its gate connected to a second bias voltage ("bias_fes") 504. By way of example, the second bias voltage 504 may be an adjustable DC bias voltage. For example, the second bias voltage may be automatically adjusted according to temperature and/or statically adjusted according to fabrication process variation. To adjust the second bias voltage, the same techniques described above to adjust the second bias voltage of FIGS. 2A-2C may be implemented to adjust the second bias voltage of FIGS. 6A-6B. The pixel circuit 500 of FIGS. 6A-6B also includes a voltage output ("$V_{pr\_out}$") 505 that varies in response to the brightness of light impinging on the photosensitive element 501, a third N-type transistor 511 (e.g., an NMOS transistor) with its gate connected to a DC voltage (e.g., second bias voltage 504), and a diode-connected N-type transistor 513 (i.e., a fourth N-type transistor) at the output voltage 505.

As further shown in FIGS. 6A-6B, the pixel circuit 500 may be implemented in a stacked configuration with interconnects 506. In some embodiments, a plurality of interconnects 506 are provided between wafers (e.g., an upper wafer and a lower wafer, or a CIS wafer and a CMOS wafer). The number and arrangement of interconnects 506 may depend on the position and arrangement of components of pixel circuit 500 relative to one another and/or the wafer(s). For example, as shown in the exemplary embodiment of FIG. 6B, the photosensitive element 501 and the N-type transistors 507, 508, 511, and 513 are located on a CIS wafer, while the P-type transistors 502 and 510, bias voltages 504 and 503, and voltage output 505 are located on one or more CMOS wafers, with the four interconnects 506 being positioned between the CMOS and CIS wafers.

The exemplary pixel circuit 500 can provide several advantages, including leakage compensation at low light levels impinging on the photosensitive element 501 and thus better control and linearization of the gain boost from the second P-type transistor 502 at low light levels (due to the third N-type transistor 511). In addition, pixel circuit 500 can provide compensation of the body effect, thereby improving the gain of any following stage receiving the voltage output 505 (due to the diode-connected N-type transistor 513), the increased processing power resulting from the first and second N-type transistors 507, 508. The embodiment of pixel circuit 500 also provides the opportunity to use different fabrication processes for different wafers in order to minimize pixel size and, at the same time, maximize the overall pixel density (due to the stacked implementation). With the pixel circuit 500, it is also possible to further optimize pixel gain and contrast sensitivity due to the multiple pixel interconnects 506.

Figure 7A:
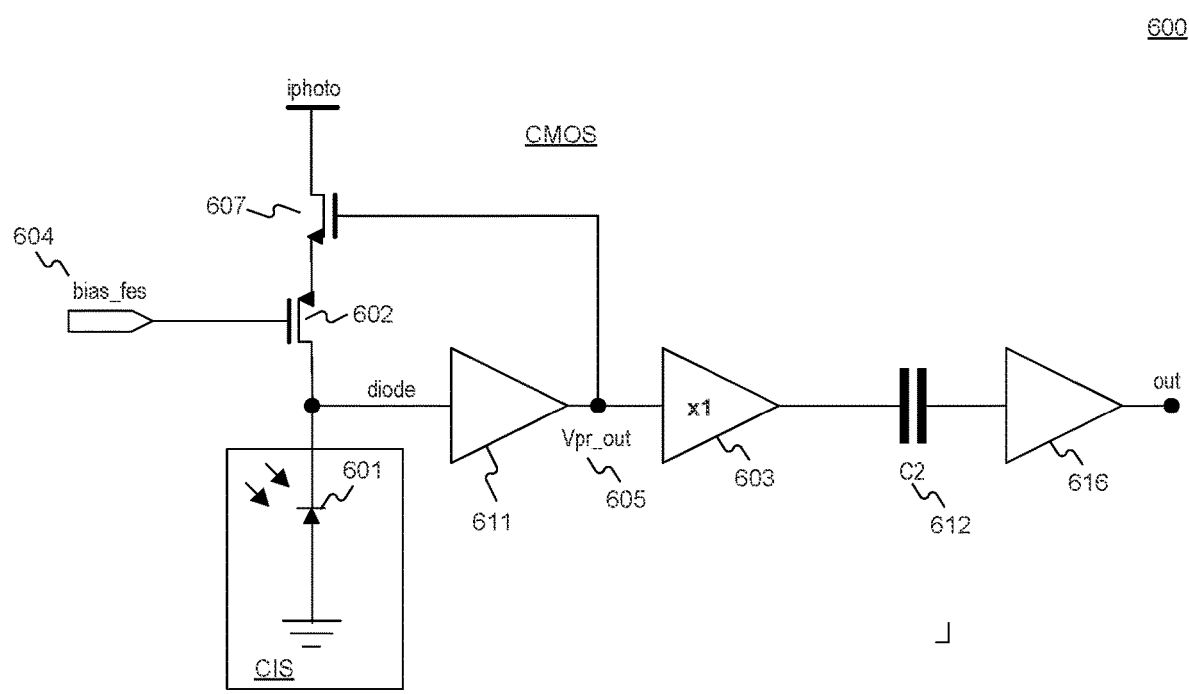
FIGS. 7A and 7B provide example schematic representations of further pixel circuits, according to embodiments of the present disclosure.
Figure 7B:
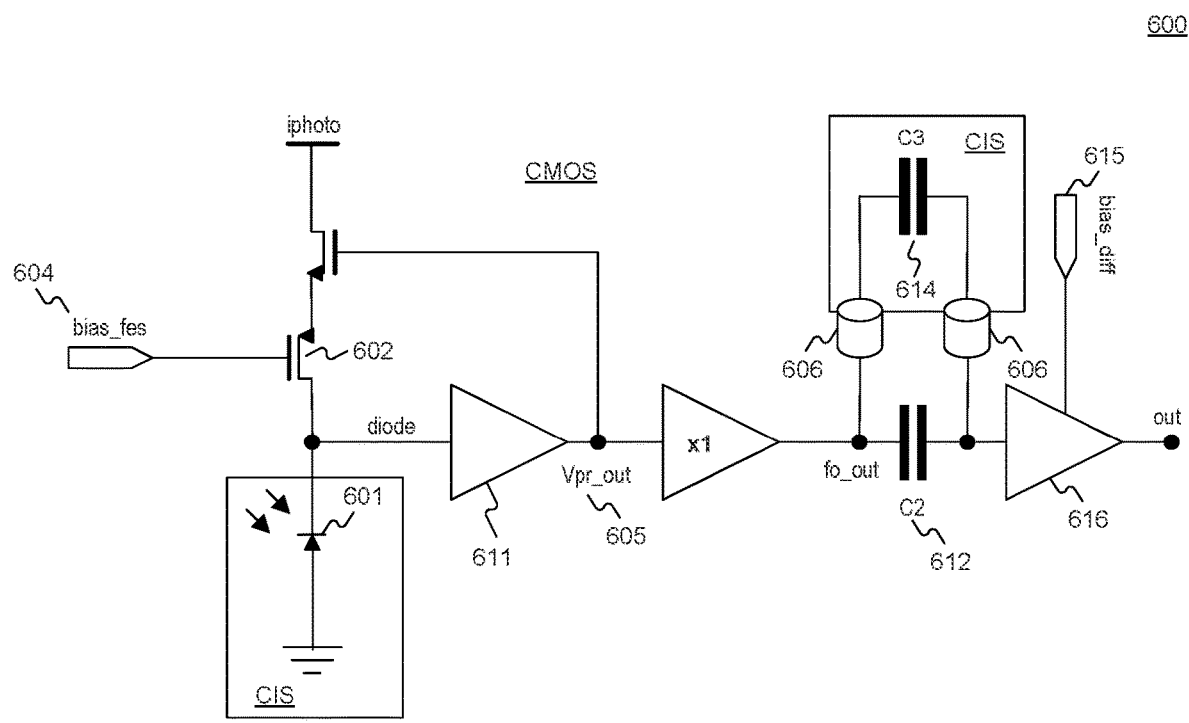

FIGS. 7A-7B provide example schematic representations of yet other pixel circuits, according to embodiments of the present disclosure.

With reference to FIG. 7A, an example pixel circuit 600 is disclosed. The pixel circuit 600, as well as any of the above-described example embodiments of a pixel circuit, may be used alone or in combination with other components to implement the front-end circuitry to an event-based vision sensor. By way of example, the pixel circuit 600 includes a current-to-voltage (I/V) converter, which comprises amplifier 611, transistor 602, and feedback transistor 607, that is configured to receive the current signal from the photosensitive element 601 and generate a voltage signal (at "Vpr_out") 605 based on the received current signal. The amplifier 611 itself comprises one or more N-type transistors (e.g., transistor 508 and, optionally, transistor 513) and a P-type transistor with its gate connected to a bias voltage (e.g., transistor 510 and bias voltage 503). The pixel circuit 600 also includes a first capacitor 612, which is electrically coupled (via buffer 603) to the converter in series and configured to receive the voltage signal (at "Vpr_out") 605 from the converter, and an amplifier 616 electrically coupled, at an input, to the first capacitor 612 in series and configured to generate, at an output, an amplified signal based on an output signal from the first capacitor 612.

In the embodiments of FIGS. 7A-7B, the gate of transistor 602 is connected to a bias voltage 604, such as a DC bias voltage ("bias_fes"). By way of example, the bias voltage 604 may be an adjustable DC bias voltage. For example, the bias voltage may be automatically adjusted according to temperature and/or statically adjusted according to fabrication process variation. To adjust the bias voltage, the same techniques described above to adjust the second bias voltage of FIGS. 2A-2D may be implemented to adjust the bias voltage 604 of FIGS. 7A-7B.

Various configurations, including stacked arrangements with one or more interconnects, may be used to implement the pixel circuit 600. For example, in accordance with the embodiment of FIG. 7A, the I/V converter (including amplifier 611, transistor 602, and feedback transistor 607) and the first capacitor 612 may be implemented in a CMOS wafer along with the buffer 603, the amplifier 616, and/or other components. Separately, a CIS wafer may be provided with remaining components of the pixel circuit 600, such as photosensitive element 601.

Referring now to FIG. 7B, another embodiment of pixel circuit 600 is provided that utilizes a stacked configuration with interconnects 606. For example, as shown in FIG. 7B, pixel circuit 600 may include a second capacitor 614 connected in parallel with the first capacitor 612. The second capacitor 614 may be implemented in one or more CIS wafer(s) along with photosensitive element 601 and connected to the first capacitor 612 in a CMOS wafer through at least two interconnects 606 between the two or more wafers.

In accordance with embodiments of the present disclosure, stacked wafer implementations of the pixel circuit (100-600) may provide a number of benefits. For example, stacked implementations of the pixel circuit: (i) can reduce the pixel size by placing pixel circuitry underneath the photosensitive element, while also maximizing the photosensitive area (i.e., maximizing the fill factor of the pixel), and (ii) enable the use of optimized fabrication process technologies which may differ for each portion of the stacked implementation. One or more interconnects per pixel may be used to achieve such stacked implementations. If only one interconnect is provided per pixel, the addition of the P-type transistor (e.g., P-type transistor 102 of FIGS. 2A-2D) within the pixel circuit imposes partitioning requirements which place only the photosensitive element on the upper wafer (e.g., a CIS wafer). With multiple interconnects per pixel (e.g., two or more interconnects per pixel, such as interconnects 506 in FIG. 6A-6B or interconnects 606 in FIG. 7B), such a partitioning requirement is removed.

If the hybrid bonding pitch is small enough to allow to fit several (instead of one) hybrid bonding interconnects per pixel, other wafer partitioning options are possible, as exemplified in FIGS. 6A-6B. The embodiments of FIGS. 6A-6B show schematic representations of a pixel circuit 500 for one pixel of an event sensor, wherein the complete event sensor is made up of a plurality of such pixels. Each pixel circuit may be implemented with two or more wafers. By way of example, and with further reference to FIG. 11, such a configuration may include two stacked wafers 1001, 1002 including a plurality of interconnects 1006 between the wafers 1001, 1002, as represented in the stacked configuration 1000 of FIG. 11.

Referring again to FIGS. 6A-6B, the pixel circuit 500 illustrated therein comprises a combination of two P-type transistors 502, 510 and four N-type transistors 507, 508, 511, and 513. The pixel circuit 500 may be implemented with a stacked configuration of wafers. For example, the photosensitive element 501 and the four N-type transistors 507, 508, 511, and 513 may be located on a CIS wafer, and a plurality of interconnects 506 (e.g., four interconnects) may be provided between the CMOS wafer and the CIS wafer (like wafers 1001 and 1002 of FIG. 11). In this configuration, the adjustable second bias voltage 504, the P-type transistors 502, 510, and the output voltage 505 may be located on the CMOS wafer.

If multiple interconnects per pixel are available, the photodiode or other photosensitive element and all N-type transistors can be located on a common wafer, such as a CIS wafer. The main advantage of such partitioning is that CIS N-type devices are optimizable for joint operation with the photosensitive element. With this architecture, the photosensitive element and the connected N-type transistors can share the same diffusion and the photosensitive element can avoid being directly connected to the large parasitic capacitance linked to the hybrid bonding and the transition from one wafer to another. The exemplary partitioning illustrated in FIG. 6B places the photosensitive element 501 and the four N-type transistors 507, 508, 511, and 513 in the CIS wafer and places the P-type transistors 502, 510 in the CMOS wafer, as described above.

In the embodiment of FIG. 7B, more than one interconnect 606 is provided per pixel and consequently the area and metals available on the CIS wafer may be used to increase a capacitance in a downstream part of the full pixel circuit (i.e., combining capacitors 612 and 614). Increasing this capacitance also increases overall pixel gain, and thereby the contrast sensitivity. Specifically, as shown in FIG. 7B, the pixel circuit 600 includes a first capacitor 612 connected in parallel with a second capacitor 614. The second capacitor 614 may be implemented in a CIS wafer and connected to the first capacitor 612 implemented on a CMOS wafer through at least two interconnects 606. In combination, the first capacitor 612 and the second capacitor 614 increase a capacitance of, e.g., the downstream amplifier 616 thereby increasing the overall gain of the pixel circuit 600.

Figure 8:
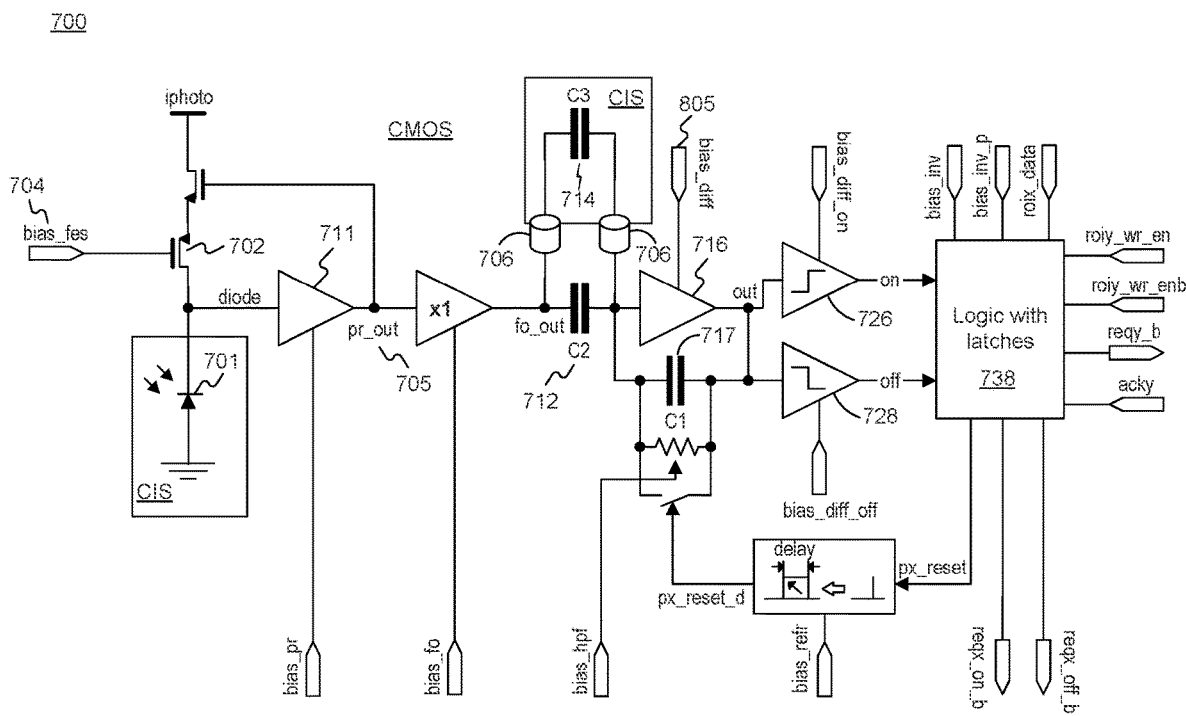
FIG. 8 is an example schematic representation of yet another pixel circuit with additional components for implementing an event sensor, according to embodiments of the present disclosure.

Referring to FIG. 8, an example schematic representation is provided of another pixel circuit 700, according to embodiments of the present disclosure. FIG. 8 illustrates an arrangement of components for pixel circuit 700. For example, pixel circuit 700 includes an I/V converter which comprises amplifier 711, transistor 702, and a feedback transistor 707, a second amplifier 716, comparators 726 and 728, a first capacitor 717, a second capacitor 712, and a logic block (e.g., implemented with latches) 738, all of which are located on a common wafer, such as a CMOS wafer. Pixel circuit 700 also includes a photosensitive element 701 and a third capacitor 714 that are implemented on another wafer, such as a CIS wafer. With the pixel circuit 700 of FIG. 8, increased pixel gain can be achieved using multiple interconnects 706 between the wafers (e.g., between the CMOS and CIS wafers) and adding capacitance via the third capacitor 714. As will be appreciated from this disclosure, other configurations and arrangements are possible, and FIG. 8 is a non-limiting example.

In the embodiments of FIG. 8, the gate of transistor 702 is connected to a bias voltage 704, such as a DC bias voltage ("bias_fes"). By way of example, the bias voltage 704 may be an adjustable DC bias voltage. For example, the bias voltage may be automatically adjusted according to temperature and/or statically adjusted according to fabrication process variation. To adjust the bias voltage, the same techniques described above to adjust the second bias voltage of FIGS. 2A-2C may be implemented to adjust the bias voltage 704 of FIG. 8.

In the example pixel circuit embodiment of FIG. 8, the P-type transistor 702 may provide a gain boost by a factor of approximately two (e.g., a range of 1.5 to 2.5). An adjustment of a bias voltage 704 applied to the gate of transistor 702 may cause a DC level of the voltage output 705 ("pr_out") to shift up or down without changing the overall gain of the pixel circuit 700. For example, the adjustment of the bias voltage 704 allows for shifting of the potential of the output voltage 705 based on variations in temperature or fabrication processes utilized. Such shifting of the output voltage potential prevents entry of the pixel into lower or upper saturation areas. As illustrated in the graph 810 of FIG. 9, shifts of the output voltage ("$V_{pr\_out}$") versus illuminance ("In") curve based on temperature are made arbitrarily small by the adjustment of the bias voltage ("bias_fes") (e.g., 704 in FIG. 8, as well as in the bias voltage in other example pixel circuits herein) as a function of the temperature. The latter adjustment as a function of the temperature is shown in FIG. 10.

In embodiments of the pixel circuits described herein, an adjustment of the bias voltage (e.g., 704 in FIG. 8) applied to the second P-type transistor (e.g., 702 in FIG. 8), as a function of temperature, prevents entry into upper or lower saturation areas and thereby improves a dynamic range of the pixel circuit. Advantageously, capacitor 714, in combination with capacitor 712, increases a capacitance stage for the second amplifier 716 and, in combination with capacitor 717, further increases the overall gain of the pixel circuit 700. The graph 810 of FIG. 9 illustrates the arbitrarily small shift of the output voltage versus illuminance curve as a result of temperature variations as well as the resulting lack of entry into upper and lower saturation areas for any portions of the curves. The arbitrarily small shift of the output voltage versus illuminance curve and the lack of entry into upper and lower saturation areas forms the dynamic range optimization of the pixel circuit, consistent with embodiments of the present disclosure. Furthermore, the gain boost by a factor of approximately two (e.g., a range of 1.5 to 2.5) effected by the second P-type transistor, the N-type transistors, and the lack of entry of the pixel into upper and lower saturation areas, results in an increased contrast sensitivity of the pixel circuit.

In some embodiments of any of the pixel circuits described herein, an adjustment of the bias voltage (e.g., 704 in FIG. 8), as effected via the second P-type transistor (e.g., 702 in FIG. 8), dependent on fabrication process variations, similarly prevents entry into upper or lower saturation areas and thereby optimizes a dynamic range of the pixel circuit.

Figure 11:
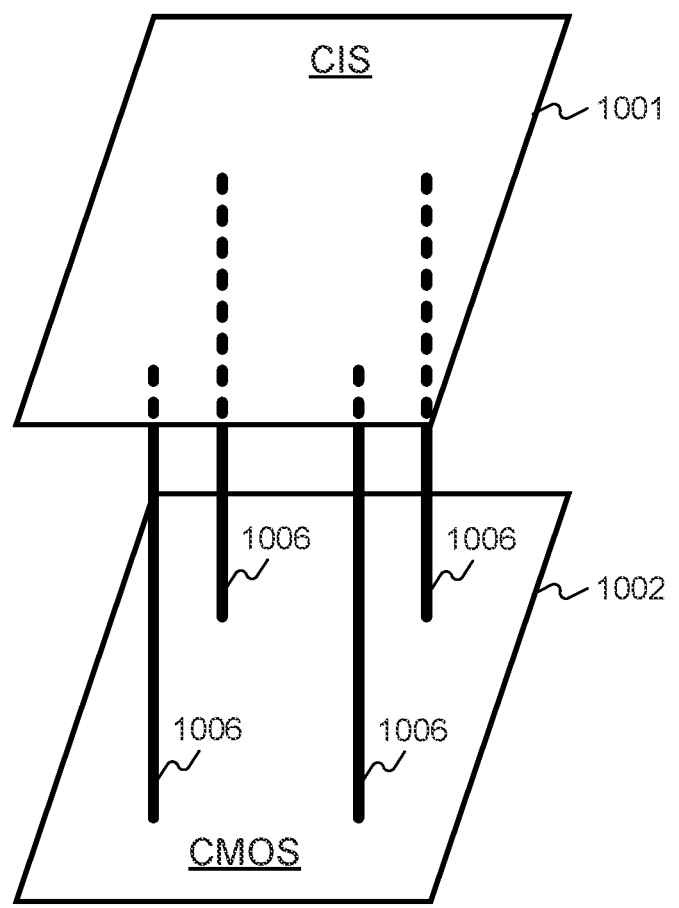
FIG. 11 is an example representation of a stacked configuration of wafers with interconnects for implementing a pixel circuit, according to embodiments of the present disclosure.

FIG. 11 shows an exemplary 3D stacked configuration 1000 for use with implementing a pixel circuit, consistent with the disclosed embodiments. As represented in FIG. 11, the stacked configuration includes four interconnects 1006 between a top wafer 1001 (e.g, a CIS wafer) and a bottom wafer 1002 (e.g., a CMOS wafer). As disclosed herein, such stacked implementation for a pixel circuit may provide at least two advantages: (i) it can reduce the pixel size by placing pixel circuitry underneath the photosensitive element, while also maximizing the photosensitive area (i.e., maximizing the fill factor of the pixel), and (ii) it can enable the use of optimized fabrication process technologies which may differ for each portion of the stacked implementation. One or more interconnects per pixel may be used to achieve such stacked implementations. If only one interconnect is provided per pixel, the addition of the second P-type transistor (e.g., P-type transistor 702 of FIG. 8) within the pixel circuit imposes partitioning requirements which place only the photosensitive element on the top or upper wafer (e.g., a CIS wafer). With multiple interconnects per pixel (e.g., two or more interconnects 1006), such a partitioning requirement is removed. Advantageously, along with the photosensitive element, additional components of the pixel circuit (e.g., N-type transistors) may be located in the upper or top wafer.

Figure 12:
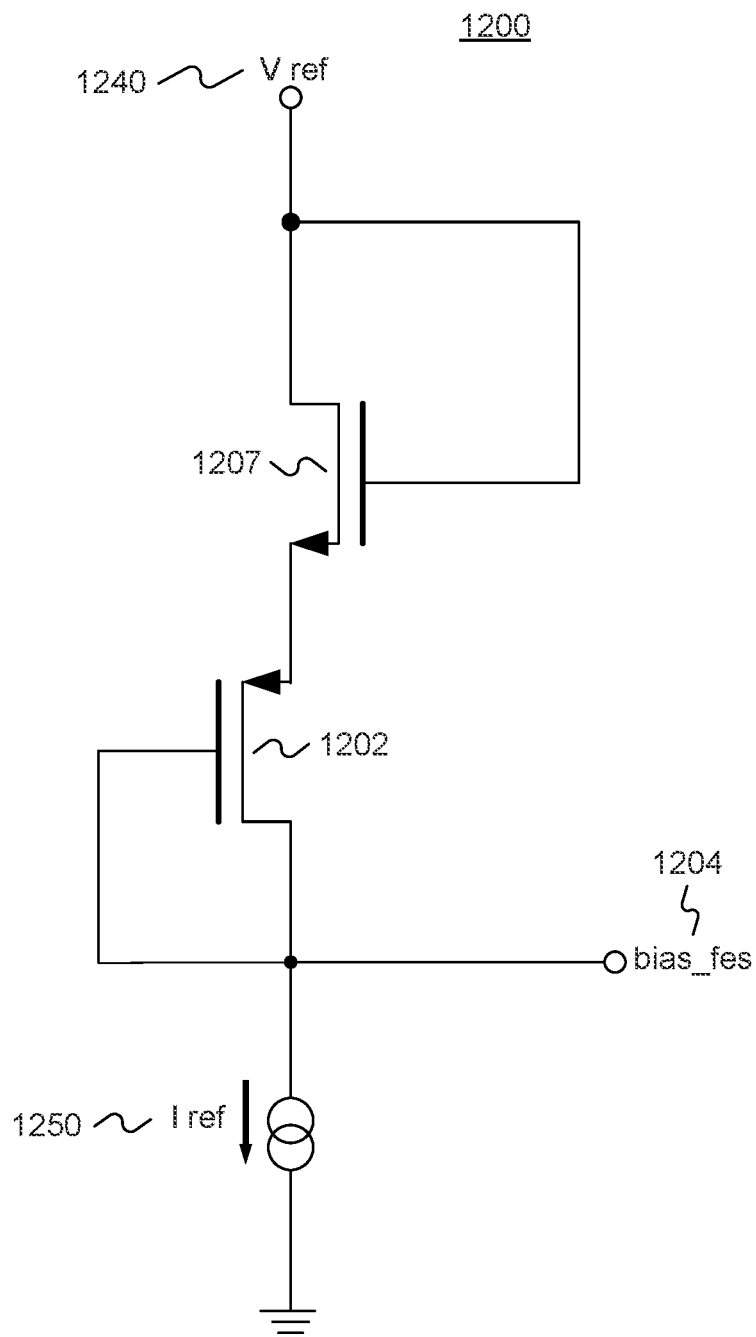
FIG. 12 provides an example schematic representation of a biasing circuit for adjusting a bias voltage of a pixel circuit, according to embodiments of the present disclosure.

FIG. 12 illustrates an example biasing circuit 1200 for dynamically and/or statically adjusting a bias voltage of a pixel circuit (e.g., FIG. 2A or the other exemplary pixel circuits herein), according to embodiments of the present disclosure. The biasing circuit 1200 may be configured to generate a bias voltage ("bias_fes") 1204 as an output which is supplied to the pixel circuit. By setting an appropriate value for a current reference "I ref" (i.e., a programmable current source) and a voltage reference "V ref" (i.e., a programmable voltage source), the bias voltage 1204 may be statically set and/or adjusted for the fabrication process parameters associated with the pixel circuit. Additionally, or alternatively, the bias voltage 1204 may be automatically adjusted in response to the chip temperature of the pixel circuit. As disclosed herein, this may provide dynamic adjustments to the bias voltage to address temperature fluctuations within the pixel circuit. Therefore, biasing circuit 1200 may be implemented to provide a bias voltage to a pixel circuit to ensure, for a given photocurrent, a minimized variability of an output voltage ("Vpr_out") of the pixel circuit due to variations of fabrication process parameters and/or temperature fluctuations. Adjustment of the bias voltage increases a saturation-free operating range of the pixel circuit saturation and thereby improves pixel sensitivity and/or a dynamic range of the pixel circuit.

By way of example, fabrication process parameters may vary based on whether the combinations of P-type and N-type transistors of a given pixel circuit include fast- or slow-type transistors, e.g., fast NMOS/fast PMOS (FnFp), fast NMOS/slow PMOS (FnSp), slow NMOS/fast PMOS (SnFp), and slow NMOS/slow PMOS (SnSp). Slow-type transistors correlate to an increase in threshold voltage compared to the values for a typical fabrication process, while fast-type transistors correlate to a decrease in threshold voltage compared to the values for a typical fabrication process. As a result of various combinations of transistors and their varying effects on the threshold voltage, variations in the output voltage may occur based on the particular transistors fabricated for use within a pixel circuit. By ensuring that the P-type and N-type transistors in the pixel circuit correspond to P-type and N-type transistors in the biasing circuit 1200, the biasing circuit comprises P-type and N-type transistors which have the same fabrication parameters as those in the pixel circuit. Therefore, the biasing circuit 1200 is able to apply an appropriate adjustment to the bias voltage provided to a connected pixel circuit to account for variations in fabrication parameters and thereby minimize variations in an output voltage of the connected pixel circuit by counteracting, or taking into account, the effects in the voltage of the connected pixel circuit due to particular fabrication parameters of the connected pixel circuit. See FIGS. 13-20 for a further description and examples of the operation and effects of a biasing circuit with respect to variations in fabrication parameters, consistent with the disclosed embodiments.

In addition to the effects of varying fabrication parameters, an output voltage of an exemplary pixel circuit disclosed herein may also have a dependency on a temperature of the pixel circuit due to a thermal voltage associated with the pixel circuit. Because of such dependency on the chip temperature, the biasing circuit 1200 may also be utilized to adjust the bias voltage provided to a pixel circuit in response to temperature fluctuations. For example, by adjusting the bias voltage ("bias_fes") 1204 in response to temperature, the biasing circuit 1200 may be configured to cause an upward shift of an output voltage of the pixel circuit for higher temperatures and a downward shift of the output voltage of the pixel circuit for lower temperatures. As a result, the maximal variation of the output voltage of the pixel circuit may be further reduced. Also, by ensuring that the P-type and N-type transistors in the pixel circuit correspond in type to the P-type and N-type transistors in the biasing circuit 1200, the biasing circuit is configured to comprise P-type and N-type transistors which have the same thermal properties as those in the pixel circuit. Therefore, the biasing circuit 1200 is able to sense temperature fluctuations, which are the same temperature fluctuations experienced by a connected pixel circuit. By setting an appropriate value for a current reference "I ref" (i.e., a programmable current source) and a voltage reference "V ref" (i.e., a programmable voltage source), the biasing circuit 1200 can automatically adjust the bias voltage 1204 provided to a connected pixel circuit to account for temperature fluctuations. The effect of such adjustment minimizes variations in an output voltage of the connected pixel circuit by counteracting, or taking into account, the variations in the voltage of the connected pixel circuit due to chip temperature fluctuations. See FIGS. 13-20 for a further description and examples of the operation and effects of a biasing circuit with respect to temperature fluctuations, consistent with the disclosed embodiments.

Referring in greater detail to the example embodiment of FIG. 12, the biasing circuit 1200 may comprise a P-type transistor 1202 in a diode configuration (i.e., with a gate and source of the transistor being connected) and an N-type transistor 1207 in a diode configuration. As shown in FIG. 12, the P-type transistor 1202 and the N-type transistor 1207 may be arranged in series. Further consistent with the above description, transistors 1202 and 1207 may correspond (e.g., in type or kind) to a P-type transistor and an N-type transistor, respectively, in the connected pixel circuit. For example, P-type transistor 1202 may correspond to P-type transistor 102 of the exemplary pixel circuit 100 shown in FIG. 2A, and N-type transistor 1207 may correspond to N-type transistor 107 of the exemplary pixel circuit 100 shown in FIG. 2A. Additionally, to set and/or further adjust the bias voltage 1204, the biasing circuit 1200 may comprise a programmable voltage source 1240 ("V ref") and a programmable current source 1250 ("I ref"). By way of example, a programmable voltage source or a programmable current source may be implemented by one or more DACs (digital to analog converters) that are configured to convert a digital input or word to an analog signal (e.g., a target voltage or a current). Further, in order to set and/or program the programmable voltage and/or current source, one or more registers may be used in combination with the one or more DACs, wherein the register(s) stores values in a digital format which correspond to analog values. As an example, for the programmable voltage source, a linear relationship between a digital input and an analog voltage output may be used. As another example, for the programmable current source (due to a wider range) a logarithmic relationship between a digital input and an analog current output may be used. In some embodiments, the programmable voltage and current sources may remain constant in response to temperature changes.

As an example, a voltage output of the biasing circuit may be set to a value for which, over a specified operating range of a connected pixel circuit (e.g., a temperature range of negative 25 degrees C. to 85 degrees C., and an illumination range of, e.g., 1fA to 1 nA), the output voltage of the pixel circuit would never fall below a certain voltage relative to ground (GND) (e.g., 0.1 V above GND). Such would be the case for the full operating range of the pixel circuit and for even the worst fabrication process parameter variation. In some embodiments, the current source "$I_{ref}$" may be set or programmed, in a first step, to achieve a preferred interception point of the "$V_{pr\_out}(I_{ph},$ temperature)" curve (see, e.g., FIGS. 18 and 19), and in a second step, the voltage source "V ref" may be set or programmed to shift the voltage output of the biasing circuit to fulfill a desired condition for the output voltage of the pixel circuit (e.g., the condition discussed above with relation to an output voltage of the pixel circuit relative to ground (GND).

In some embodiments, programmable voltage source 1240 may be set or adjusted according to a voltage supply (VDD) of a connected pixel circuit to additionally and automatically adjust an output voltage of the connected pixel circuit based on a shift of the voltage supply of the connected pixel circuit (e.g., the exemplary pixel circuit 100 shown in FIG. 2A or other example pixel circuits disclosed herein). In some embodiments, a voltage buffer (e.g., a low output impedance voltage buffer—not shown in FIG. 12) may also be positioned between an output voltage 1204 of the biasing circuit and a corresponding input of a connected pixel circuit for providing an improved bias voltage supply to the connected pixel circuit.

In accordance with embodiments of the present disclosure, $V_{bias\_fes}$ of a biasing circuit (such as biasing circuit 1200 of the example embodiment of FIG. 12 of this application) can be calculated as:

$$V_{bias\_fes} = V_{ref} - V_{GS,n,b} - V_{SG,p,b}, \qquad (1)$$

using the gate source voltage of an N-type transistor, $V_{Gs,n}$, and the source gate voltage of a P-type transistor, $V_{SG,p}$. See, e.g., FIG. 12.

In some embodiments, the dependency of the drain current ($I_D$) from the voltage, $V_{GS}$, for an N-type transistor in the subthreshold operation region of saturation can be described as:

$$I_D = \frac{W_n}{L_n}\mu_n C_{ox}(n_n - 1)V_T^2 e^{\frac{V_{GS,n} - V_{th,n}}{n_n V_T}}, \qquad (2)$$

using the width and length, $W_n$ and $L_n$, of the transistor, the subthreshold slope, $n_n$, the carrier mobility, $\mu_n$, the gate oxide capacitance, $C_{ox}$, the thermal voltage, $V_T$, and the threshold voltage, $V_{th}$.

In some embodiments, the main impact of variations of the fabrication process parameters for an N-type transistor in a given pixel circuit may be related to a variation of the threshold voltage, $\Delta V_{th}$. This leads from Equation 2 to the following:

$$I_D = \frac{W_n}{L_n} \mu_n C_{ox}(n_n - 1) V_T^2 e^{\frac{V_{GS,n} - V_{th,n} - \Delta V_{th,n}}{n_n V_T}}, \quad (3)$$

wherein the following relationship may also exist:

$$I_{D0,n} = \frac{W_n}{L_n} \mu_n C_{ox}(n_n - 1) V_T^2 e^{-\frac{V_{th}}{n_n V_T}}. \quad (4)$$

Equation 3 may also be expressed as:

$$I_D = I_{D0,n} e^{\frac{V_{GS,n} - \Delta V_{th,n}}{n_n V_T}}. \quad (5)$$

Accordingly, for a P-type transistor, Equation 5 may correspond to:

$$I_D = I_{D0,p} e^{\frac{V_{GS,p} - \Delta V_{th,p}}{n_p V_T}}. \quad (6)$$

In some embodiments, the output voltage in a pixel circuit, $V_{pr\_out}$, may be calculated as follows:

$$V_{pr\_out} = V_{bias} + V_{GS,n,p} + V_{SG,p,p}. \quad (7)$$

Inserting the relationships of Equations 5 and 6 into Equation 7 leads to the following:

$$V_{pr\_out} = \quad (8)$$
$$V_{bias\_fes} + n_{n,p} V_T \ln\left(\frac{I_{ph}}{I_{D0,n,p}}\right) + \Delta V_{th,n,p} + n_{p,p} V_T \ln\left(\frac{I_{ph}}{I_{D0,p,p}}\right) + \Delta V_{th,p,p},$$

where $I_{ph}$ is the photocurrent inside the pixel circuit.

Similarly, inserting the relationships of Equations 5 and 6 into Equation 1 leads to the following:

$$V_{bias\_fes} = \quad (9)$$
$$V_{ref} - n_{n,b} V_T \ln\left(\frac{I_{ref}}{I_{D0,n,b}}\right) - \Delta V_{th,n,b} - n_{p,b} V_T \ln\left(\frac{I_{ref}}{I_{D0,p,b}}\right) - \Delta V_{th,p,b}.$$

By substituting the value for $V_{bias\_fes}$ from Equation 9 into Equation 8, P-type and N-type transistors in a biasing circuit which correlate to similar P-type and N-type transistors in a connected pixel circuit may cause the cancellation of an impact of a variation of a threshold voltage caused by a variation of fabrication process parameters (i.e., process corners) on the output voltage of the pixel circuit, $V_{pr\_out}$, as shown by the following:

$$V_{pr_{out}} = V_{ref} - n_n V_T \ln\left(\frac{I_{ref}}{I_{D0,n}}\right) - \quad (10)$$
$$n_p V_T \ln\left(\frac{I_{ref}}{I_{D0,p}}\right) + n_n V_T \ln\left(\frac{I_{ph}}{I_{D0,n}}\right) + n_p V_T \ln\left(\frac{I_{ph}}{I_{D0,p}}\right).$$

Figure 13:
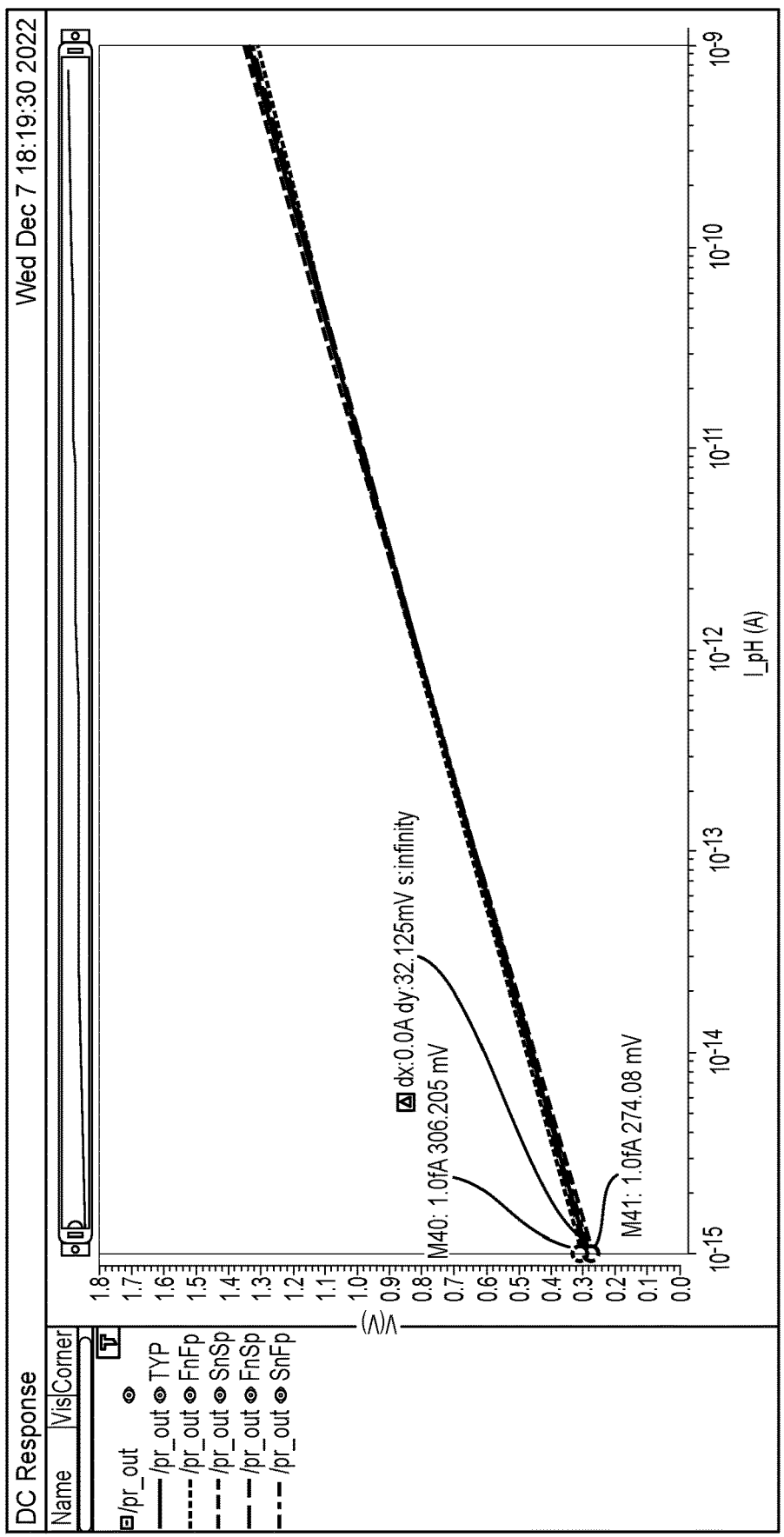
FIGS. 13-20 provide illustrations of the operation and effects of a biasing circuit with respect to variations in fabrication parameters and temperature fluctuations, consistent with embodiments of the present disclosure.

FIG. 13 shows a plot of $V_{pr\_out}$ as a function of the photocurrent, $I_{ph}$, from 1fA to 1 nA extracted from a circuit simulation, with controlled $V_{bias\_fes}$ for different process corners. In the example of FIG. 13, $V_{ref}$ is set to 0.85 V, $I_{ref}$=1 pA, and T=25 C. The 5 curves shown in the plot of FIG. 13 represent the 5 process corners (i.e., fast nmos/fast pmos (FnFp), fast nmos/slow pmos (FnSp), slow nmos/fast pmos (SnFp), slow nmos/slow pmos (SnSp)), and typical process parameters. "Slow" refers to an increase in threshold voltage (+$\Delta V_{th}$), while "fast" refers to a decrease in threshold voltage (−$\Delta V_{th}$), compared to the values for a typical process.

The maximal variation of $V_{pr\_out}$ for a given photocurrent, $I_{ph}$, over 6 decades is, in the example of FIG. 13, only 32 mV.

Figure 14:
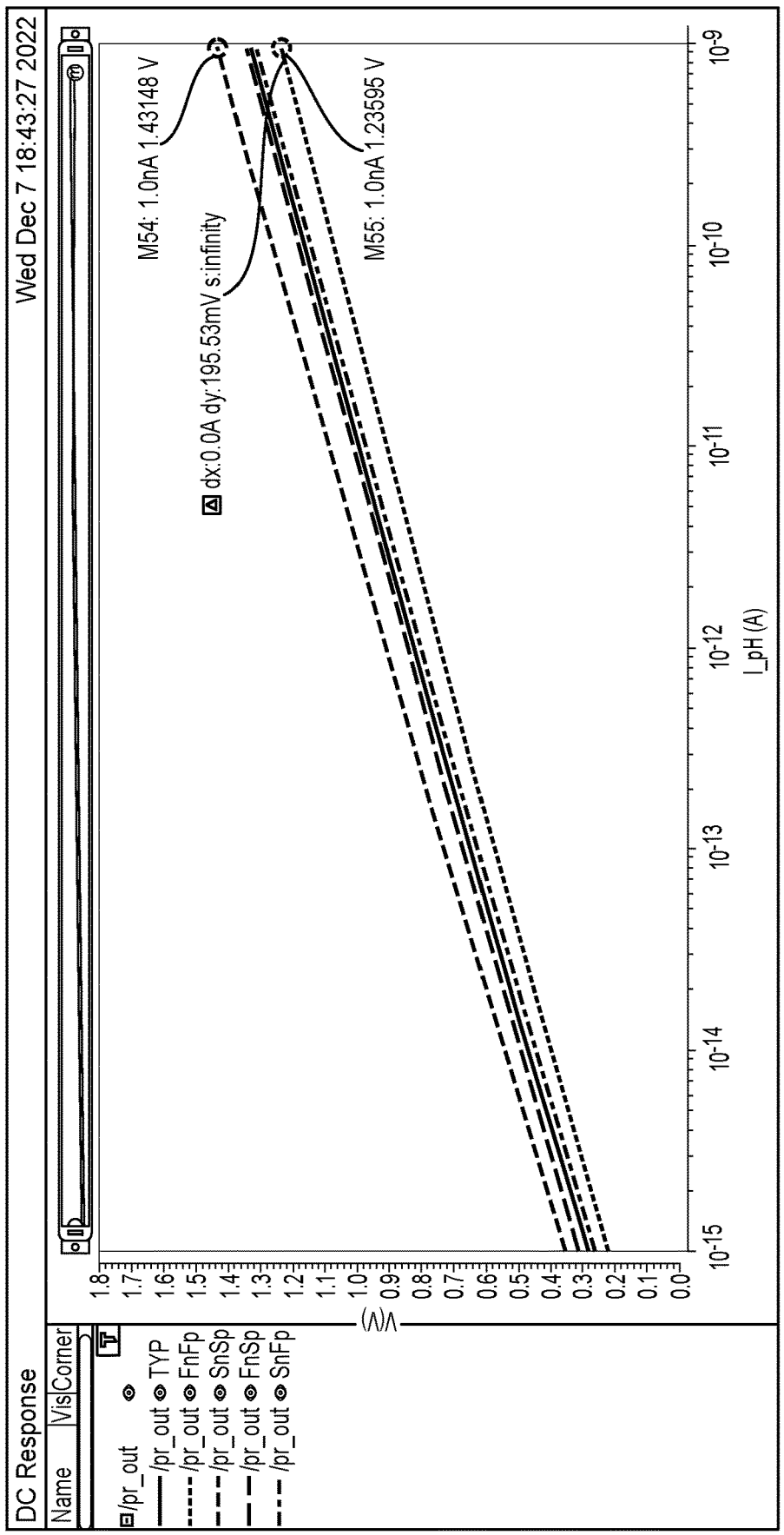

FIG. 14, in comparison, shows the results for a simulation with a constant bias voltage, $V_{bias\_fes}$, of 0.55 V for different process corners. The value of 0.55 V has, in both simulations, the same values for $V_{pr\_out}(I_{ph})$ with typical process parameters. The maximal variation of $V_{pr\_out}$ in the example of FIG. 14 is 196 mV, which is much larger than that for the controlled bias voltage example of FIG. 13. because the variation of the threshold voltages is not cancelled out according to Equation 8.

Figure 15:
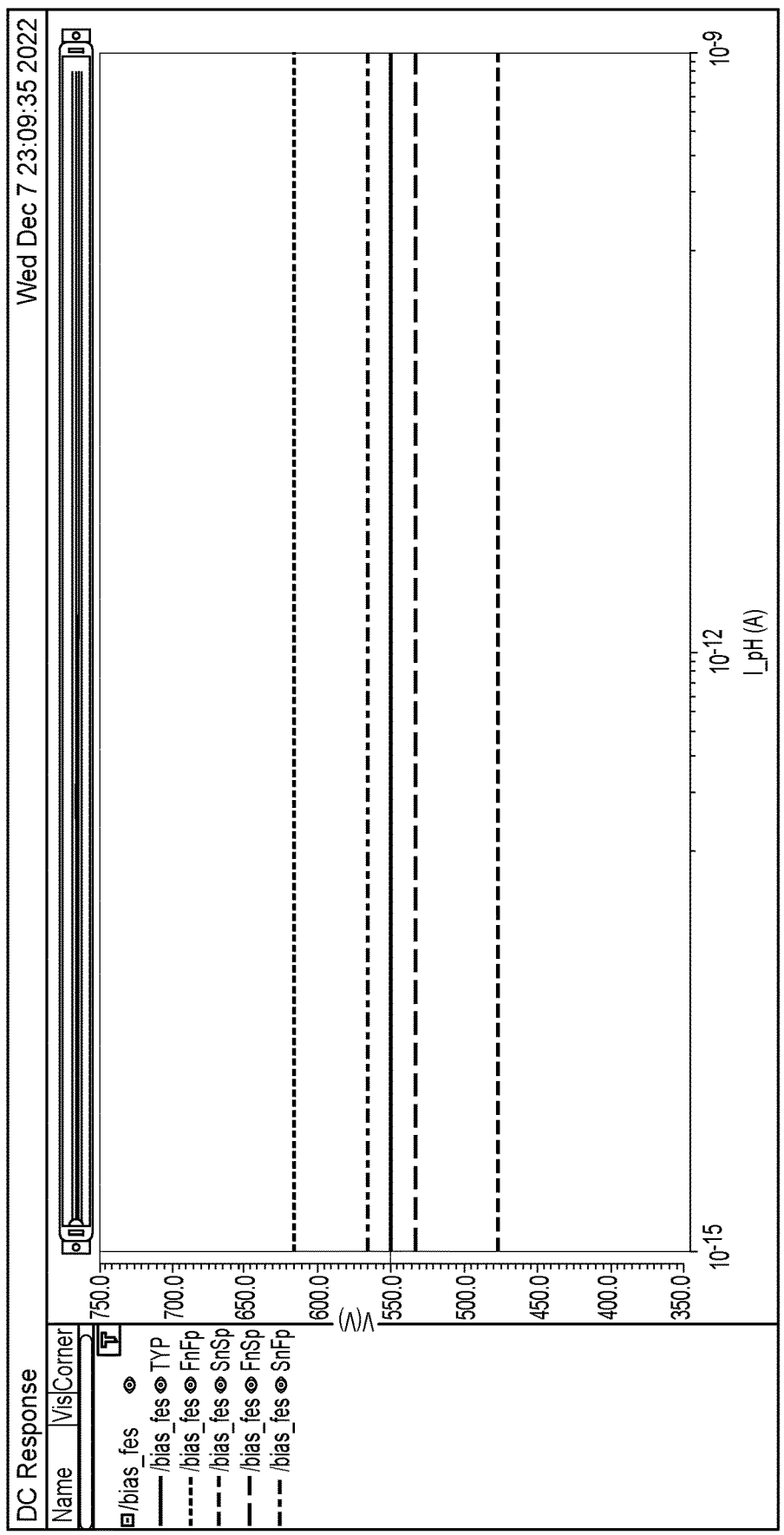

FIG. 15 illustrates the variation of $V_{bias\_fes}$ as described in Equation 9 for a biasing circuit, such as the biasing circuit 1200 exemplified in FIG. 12, depending on the process corner.

Figure 16:
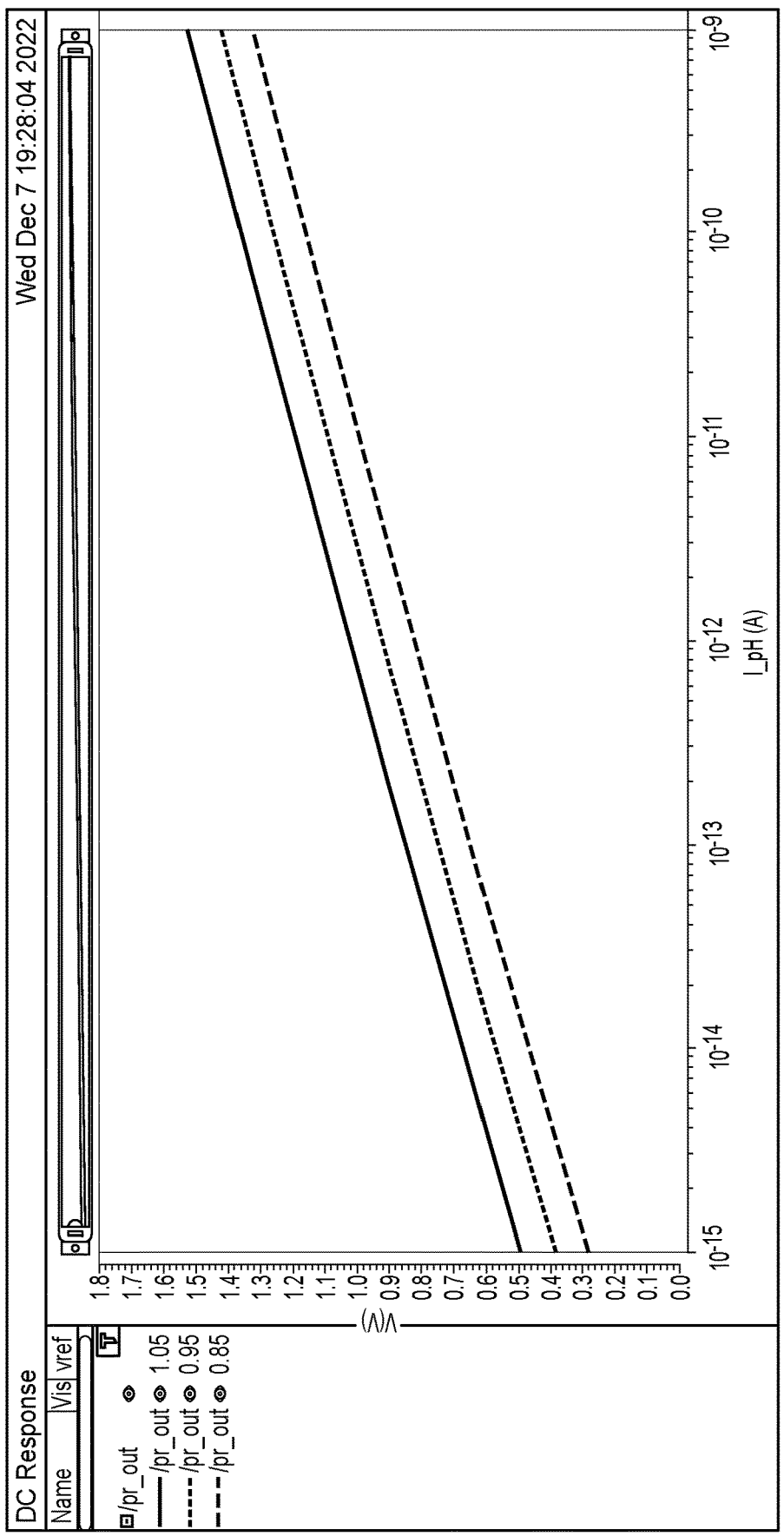

According to Equations 9 and 10, $V_{ref}$ can be used to shift $V_{bias\_fes}$ and $V_{pr\_out}$ respectively. FIG. 16 shows a plot of $V_{pr\_out}(I_{ph})$ for 0.85 V, 0.95 V, and 1.05 V, typical process parameters, $I_{ref}$=1 pA, and T=25 C. If $V_{ref}$ is referenced to VDD, it allows a minimal voltage difference between the maximal value of $V_{pr\_out}$ and VDD to be guaranteed independently of VDD to avoid circuit saturation at high photocurrents for low values of VDD.

Figure 17:
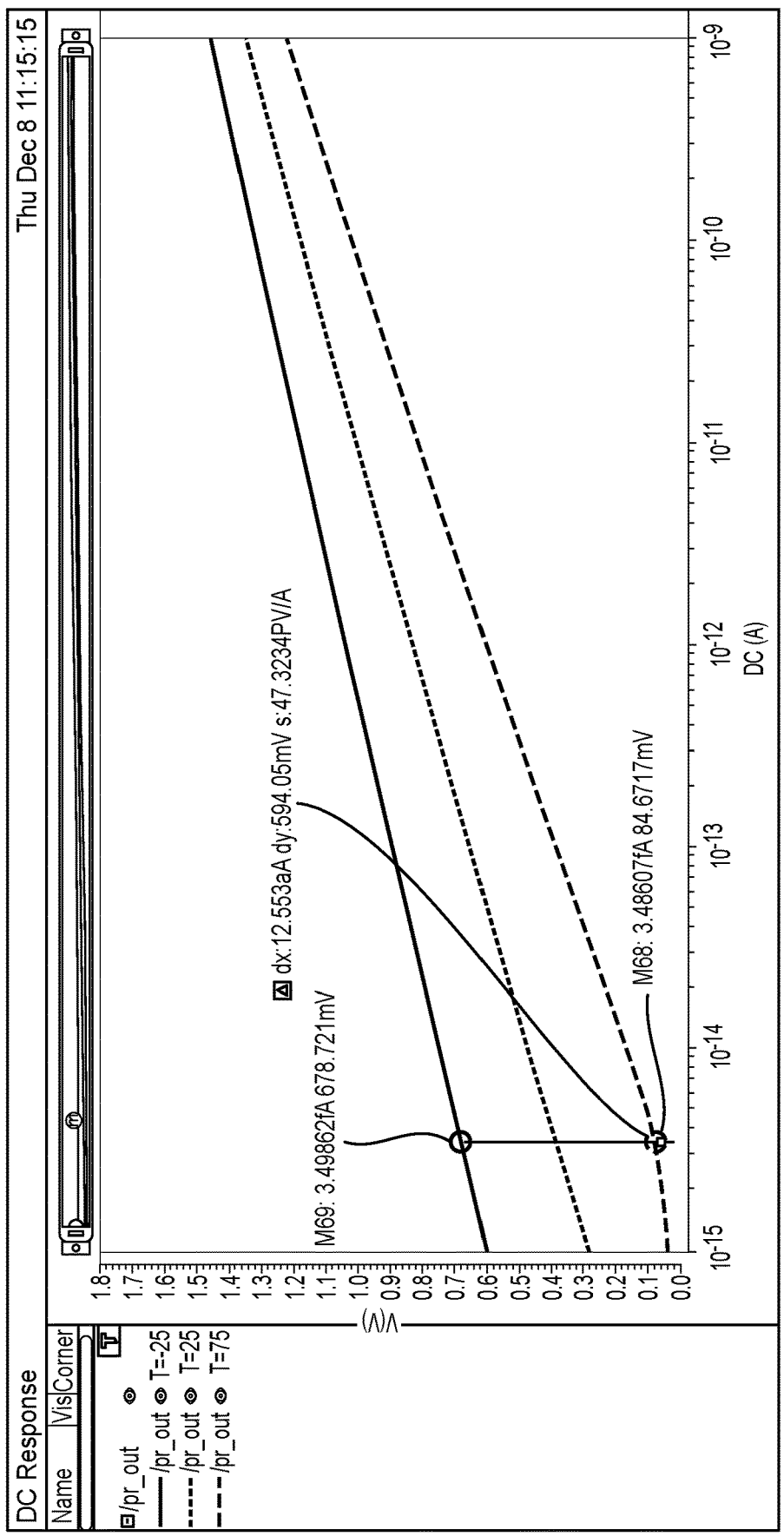

The values of $V_{pr\_out}$ as a function of $I_{ph}$, as well as the slope of the curve, show, according to Equation 8, a strong temperature dependency due to the thermal voltage, $V_T$, which is defined as $V_T$=k T/q, using the Boltzmann constant, k, the elementary charge, q, and the temperature, T. FIG. 17 shows a plot of $V_{pr\_out}$ as a function of the photocurrent, $I_{ph}$, from 1fA to 1 nA with a constant voltage, $V_{bias\_fes}$, of 0.55 V and typical process parameters ($\Delta V_{th}$=0) for 3 different temperatures: −25 degrees C., 25 degrees C., and 75 degrees C. The maximal variation of $V_{pr\_out}$ for a given photocurrent, $I_{ph}$, reaches, in this example, as much as 595 mV, while for low photocurrents, $V_{pr\_out}$ goes into saturation close to 0 V which prevents the pixel circuit from operating properly.

Figure 18:
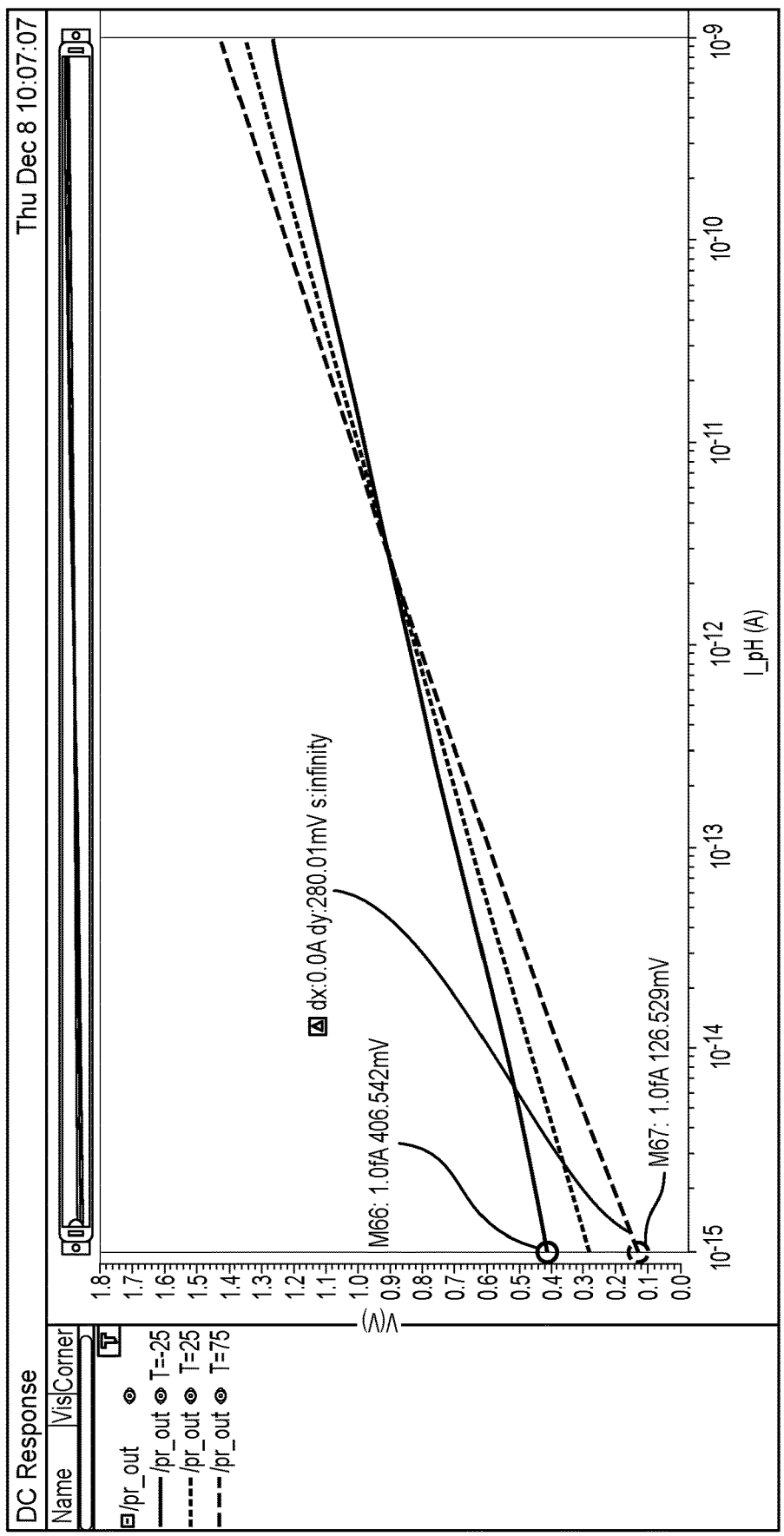

The biasing circuit, such as biasing circuit 1200 as illustrated in FIG. 12, shifts up the $V_{pr\_out}$ curves for higher temperatures and shifts down the $V_{pr\_out}$ curves for lower temperatures. As a result, the overall maximal variation of $V_{pr\_out}$ may be reduced. As the similar P-type and N-type transistors in the pixel circuit and in the biasing circuit have the same thermal properties, according to Equation 10, such reduction of variation in $V_{pr\_out}$ may be achieved by applying an appropriate value for $I_{ref}$. One option is to choose $I_{ref}$ to set the interception point of the curves close to a median of the photocurrent range. FIG. 18 shows a plot of $V_{pr\_out}$ as a function of the photocurrent, $I_{ph}$, from 1fA to 1 nA for $I_{ref}$=1 pA and typical process parameters ($\Delta V_{th}$=0) for 3 different temperatures: −25 degrees C., 25 degrees C., and 75 degrees C. Compared to a solution including a constant bias voltage, $V_{bias\_fes}$, the maximal variation of $V_{pr\_out}$ is 280 mV and thereby much lower. Additionally, any saturation at low lights may be avoided. The interception point of the curves is close to $I_{ph}$=1 pA. $I_{ref}$ may also be used to shift the interception point of the curves to achieve a particular behavior.

Figure 19:
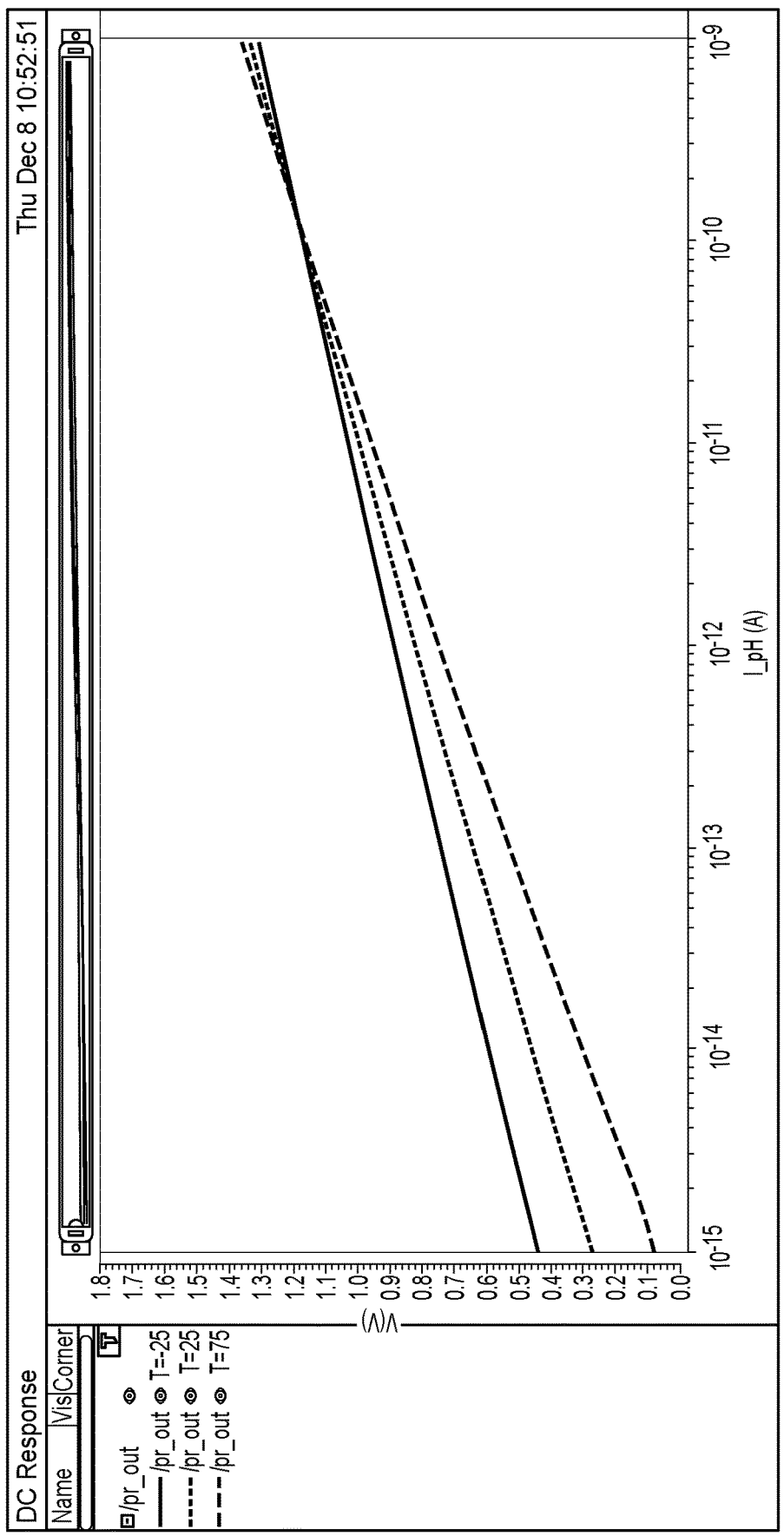

FIG. 19 shows a plot of $V_{pr\_out}$ as a function of the photocurrent, $I_{ph}$, from 1fA to 1 nA for $I_{ref}$=100 pA and typical process parameters ($\Delta V_{th}$=0) for 3 different temperatures: −25 degrees C., 25 degrees C., and 75 degrees C. In this example, the interception point is moved to $I_{ph}$=100 pA which increases the maximal variation of $V_{pr\_out}$ for low photocurrents on one side, but on the other side also significantly reduces the variation of $V_{pr\_out}$ for higher photocurrents. In the example of FIG. 19, $V_{ref}$ is changed from 0.85 V to 1.2 V to achieve, in both simulations ($I_{ref}$=1 pA and $I_{ref}$=100 pA), the same values for $V_{pr\_out}(I_{ph})$ at T=25 C.

Figure 20:
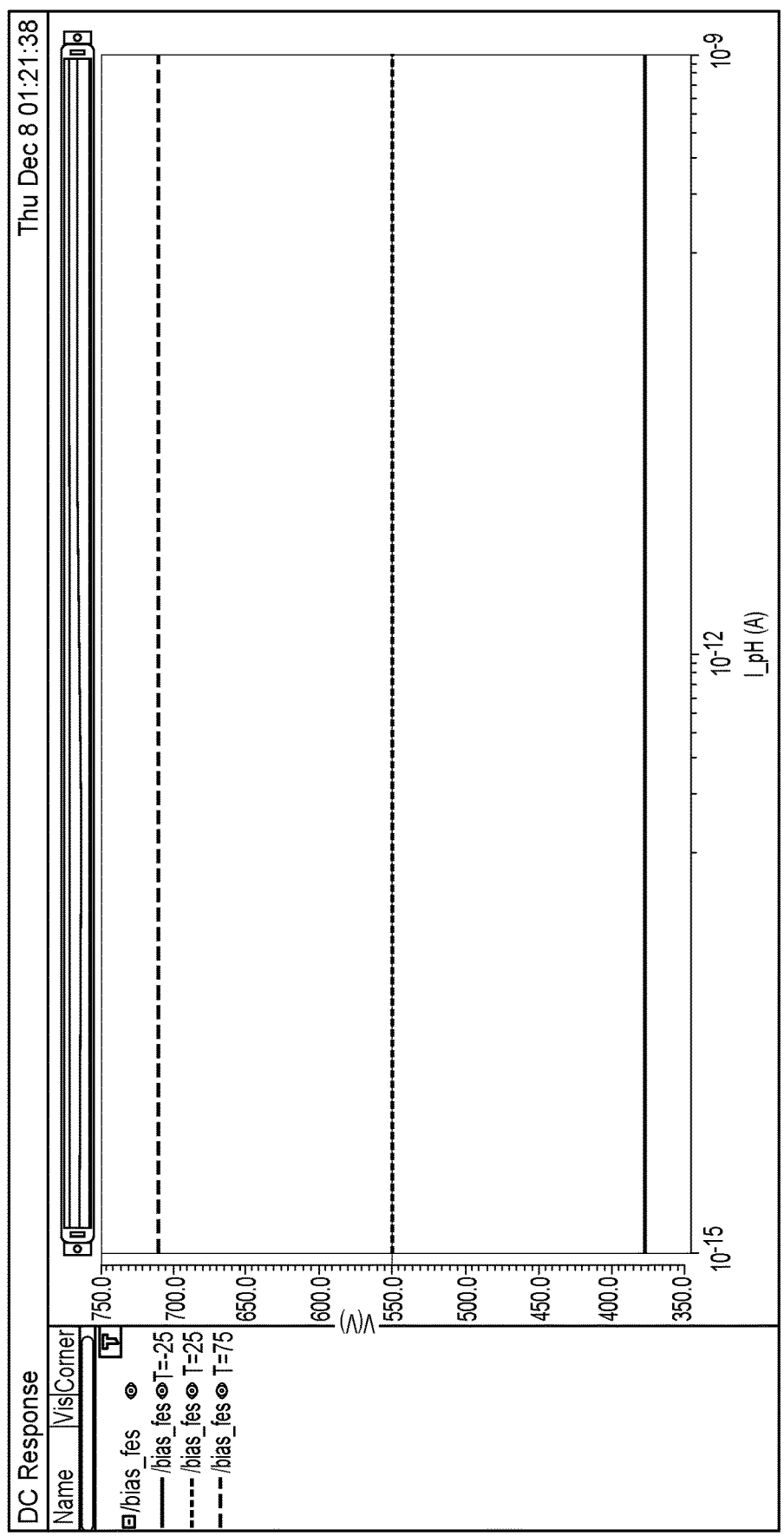

FIG. 20 illustrates the variation of $V_{bias\_fes}$ as described in Equation 9 for $V_{ref}$=0.85 V and $I_{ref}$=1 pA, depending on the temperature.

While illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent to those skilled in the art from consideration of the specification and practice of the implementations disclosed herein. It is intended that the architectures and circuit arrangements shown in figures are only for illustrative purposes and are not intended to be limited to the specific arrangements and circuit arrangements as described and shown in the figures. It is also intended that the specification and examples be considered as exemplary only, with the true scope and spirit of the invention being indicated by the following claims.

What is claimed is:

1. A pixel circuit for use with an event sensor, comprising:
a photosensitive element configured to generate a current signal in response to a brightness of light impinging on the photosensitive element;
a first N-type transistor;
a second N-type transistor;
a first P-type transistor including a gate connected to a first bias voltage;
a second P-type transistor including a gate connected to a second bias voltage, the second bias voltage being a DC bias voltage that is adjusted responsive to at least one of a chip temperature or fabrication process variation of the pixel circuit; and
a voltage output that varies in response to the brightness of light impinging on the photosensitive element;
wherein the adjustment of the second bias voltage increases a saturation-free operating range of the pixel circuit and thereby improves a dynamic range of the pixel circuit.

2. The pixel circuit of claim 1, wherein an adjustment of the second bias voltage causes a DC level of the voltage output to shift up or down without changing an overall gain of the pixel circuit.

3. The pixel circuit of claim 1, wherein the second P-type transistor affects a gain boost by a factor of approximately two.

4. The pixel circuit of claim 1, wherein the chip temperature of the pixel circuit is continuously sensed by a temperature sensitive biasing circuit and used to automatically adjust the second bias voltage.

5. The pixel circuit of claim 4, wherein the temperature sensitive biasing circuit comprises:
a third P-type transistor in series with a third N-type transistor;
a programmable current source; and
a programmable voltage source;
wherein the third P-type transistor corresponds to the second P-type transistor; and
wherein the third N-type transistor corresponds to the first N-type transistor.

6. The pixel circuit of claim 1, wherein the fabrication process variation comprises a global threshold variation that is detected by a biasing circuit and used to statically adjust the second bias voltage.

7. The pixel circuit of claim 6, wherein the biasing circuit comprises:
a third P-type transistor in series with a third N-type transistor;
a programmable current source; and
a programmable voltage source;
wherein the third P-type transistor corresponds to the second P-type transistor; and
wherein the third N-type transistor corresponds to the first N-type transistor.

8. The pixel circuit of claim 1, wherein the second P-type transistor, the first and second N-type transistors, and one or more other components of the pixel circuit are implemented in a common wafer in a non-stacked configuration.

9. The pixel circuit of claim 1, wherein the pixel circuit is implemented in a stacked configuration, wherein at least the photosensitive element is implemented on a first wafer, and wherein at least the first and second P-type transistors are implemented on a second wafer.

10. The pixel circuit of claim 1, further comprising an N-type transistor at the voltage output.

11. The pixel circuit of claim 1, further comprising a third N-type transistor including a gate connected to a DC voltage, wherein the third N-type transistor provides leakage compensation at low light levels impinging on the photosensitive element.

12. The pixel circuit of claim 11, wherein the third N-type transistor is implemented in a common wafer with the first and second P-type transistors and the first and second N-type transistors.

13. The pixel circuit of claim 12, wherein the common wafer comprises a first CMOS wafer.

14. The pixel circuit of claim 13, wherein the photosensitive element is implemented in a second CMOS wafer, the first CMOS wafer being stacked relative to the second CMOS wafer.

15. The pixel circuit of claim 14, wherein there is at least one in-pixel interconnect between the first CMOS wafer and the second CMOS wafer.

16. The pixel circuit of claim 11, wherein the first N-type transistor, the second N-type transistor, the third N-type transistor, and the photosensitive element are implemented on a common wafer.

17. The pixel circuit of claim 16, wherein the common wafer comprises a CMOS Image Sensor (CIS) wafer.

18. The pixel circuit of claim 17, wherein the first P-type transistor and the second P-type transistor are implemented in a CMOS wafer, the CMOS wafer being stacked relative to the CIS wafer.

19. The pixel circuit of claim 18, wherein there is a plurality of interconnects between the CMOS wafer and the CIS wafer.

20. The pixel circuit of claim 17, further comprising a second capacitor connected in parallel with the first capacitor, the second capacitor being implemented in a CIS wafer and connected to the first capacitor using at least two interconnects between the CMOS wafer and the CIS wafer.

21. The pixel circuit of claim 20, wherein the second capacitor in combination with the first capacitor increases a capacitance of the amplifier and increases the overall gain of the pixel circuit.

22. The pixel circuit of claim 1, further comprising:
a converter that is comprised of the first P-type transistor and configured to receive the current signal from the photosensitive element and generate a voltage signal based on the received current signal;
a first capacitor electrically coupled to the converter in series and configured to receive the voltage signal from the converter; and
an amplifier electrically coupled, at an input, to the first capacitor in series and configured to generate, at an output, an amplified signal based on an output signal from the first capacitor.

23. The pixel circuit of claim 22, wherein the converter and the first capacitor are implemented in a CMOS wafer with the second P-type transistor.

24. An event sensor with a plurality of pixels, each pixel including a pixel circuit, the pixel circuit comprising:
a photosensitive element configured to generate a current signal in response to a brightness of light impinging on the photosensitive element;
a first N-type transistor;
a second N-type transistor;
a first P-type transistor including a gate connected to a first bias voltage;
a second P-type transistor including a gate connected to a second bias voltage, the second bias voltage being a DC bias voltage that is adjusted responsive to at least one of a chip temperature or fabrication process variation of the pixel circuit; and
a voltage output that varies in response to the brightness of light impinging on the photosensitive element;
wherein the adjustment of the second bias voltage increases a saturation-free operating range of the pixel circuit and thereby improves a dynamic range of the pixel circuit.

25. The event sensor of claim 24, wherein an adjustment of the second bias voltage causes a DC level of the voltage output to shift up or down without changing an overall gain of the pixel circuit.

26. The event sensor of claim 24, wherein the second P-type transistor affects a gain boost by a factor of approximately two.

27. The event sensor of claim 24, wherein the chip temperature of the pixel circuit is continuously sensed by a temperature sensitive biasing circuit and used to automatically adjust the second bias voltage.

28. The event sensor of claim 27, wherein the biasing circuit comprises:
a third P-type transistor in series with a third N-type transistor;
a programmable current source; and
a programmable voltage source;
wherein the third P-type transistor corresponds to the second P-type transistor; and
wherein the third N-type transistor corresponds to the first N-type transistor.

29. The event sensor of claim 24, wherein the fabrication process variation comprises a global threshold variation that is detected by a biasing circuit and used to statically adjust the second bias voltage.

30. The event sensor of claim 29, wherein the biasing circuit comprises:
a third P-type transistor in series with a third N-type transistor;
a programmable current source; and
a programmable voltage source;
wherein the third P-type transistor corresponds to the second P-type transistor; and
wherein the third N-type transistor corresponds to the first N-type transistor.

31. The event sensor of claim 24, wherein the photosensitive element, the second P-type transistor, and one or more other components of the pixel circuit are implemented in a non-stacked, common wafer.

32. The event sensor of claim 24, further comprising a third N-type transistor including a gate connected to a DC voltage, wherein the third N-type transistor provides leakage compensation at low light levels impinging on the photosensitive element.

33. The event sensor of claim 32, wherein the second P-type transistor, the third N-type transistor, and one or more other components of the pixel circuit are implemented in a common wafer in a non-stacked configuration.

34. The event sensor of claim 32 wherein the event sensor is implemented in a stacked configuration, wherein at least the photosensitive element is implemented on a first wafer, and wherein at least the first and second P-type transistors are implemented on a second wafer.

35. The event sensor of claim 32, wherein the third N-type transistor is implemented in a common wafer with the second P-type transistor and the first and second N-type transistors.

36. The event sensor of claim 35, wherein the common wafer comprises a first CMOS wafer.

37. The event sensor of claim 36, wherein the photosensitive element is implemented in a second CMOS wafer, the second CMOS wafer being stacked relative to the first CMOS wafer.

38. The event sensor of claim 37, wherein there is at least one in-pixel interconnect between the first CMOS wafer and the second CMOS wafer.

39. The event sensor of claim 32, wherein the first N-type transistor, the second N-type transistor, the third N-type transistor, and the photosensitive element are implemented on a common wafer.

40. The event sensor of claim 39, wherein the common wafer comprises a CMOS Image Sensor (CIS) wafer.

41. The event sensor of claim 40, wherein the second P-type transistor is implemented in a CMOS wafer, the CMOS wafer being stacked relative to the CIS wafer.

42. The event sensor of claim 41, wherein there is a plurality of interconnects between the CMOS wafer and the CIS wafer.

43. The event sensor of claim 24, further comprising:
a converter that is comprised of the second P-type transistor and configured to receive the current signal from the photosensitive element and generate a voltage signal based on the received current signal;
a first capacitor electrically coupled to the converter in series and configured to receive the voltage signal from the converter; and
an amplifier electrically coupled, at an input, to the first capacitor in series and configured to generate, at an output, an amplified signal based on an output signal from the first capacitor.

44. The event sensor of claim 43, wherein the converter and the first capacitor are implemented in a CMOS wafer with the second P-type transistor.

45. The event sensor of claim 44, further comprising a second capacitor connected in parallel with the first capacitor, the second capacitor being implemented in a CIS wafer and connected to the first capacitor using at least two interconnects.

46. The event sensor of claim 45, wherein the second capacitor in combination with the first capacitor increases a capacitance of the amplifier and increases the overall gain of the pixel circuit.

47. The event sensor of claim 24, further comprising an N-type transistor at the voltage output.

48. A pixel circuit for use with an event sensor, comprising:
a photosensitive element configured to generate a current signal in response to a brightness of light impinging on the photosensitive element;
a first N-type transistor;
a second N-type transistor;
a P-type transistor including a gate connected to a bias voltage, the bias voltage being a DC bias voltage that is adjusted responsive to at least one of a chip temperature or fabrication process variation of the pixel circuit; and
a voltage output that varies in response to the brightness of light impinging on the photosensitive element;
wherein an adjustment of the bias voltage causes a DC level of the voltage output to shift up or down without changing an overall gain of the pixel circuit; and
wherein the adjustment of the bias voltage increases a saturation-free operating range of the pixel circuit and thereby improves a dynamic range of the pixel circuit.

49. The pixel circuit of claim 48, further comprising a first P-type transistor including a gate connected to a first bias voltage, and wherein the P-type transistor is a second P-type transistor including a gate connected to a second bias voltage, the second bias voltage comprising the DC bias voltage that is adjusted to prevent saturation and improve a dynamic range of the pixel circuit.

50. The pixel circuit of claim 49, wherein the second P-type transistor affects a gain boost by a factor of approximately two.

51. The pixel circuit of claim 48, wherein the chip temperature of the pixel circuit is continuously sensed by a temperature sensitive biasing circuit and used to automatically adjust the bias voltage.

52. The pixel circuit of claim 51, wherein the biasing circuit comprises:
a third P-type transistor in series with a third N-type transistor;
a programmable current source; and
a programmable voltage source;
wherein the third P-type transistor corresponds to the second P-type transistor; and
wherein the third N-type transistor corresponds to the first N-type transistor.

53. The pixel circuit of claim 48, wherein the fabrication process variation comprises a global threshold variation that is detected by a biasing circuit and used to statically adjust the bias voltage.

54. The pixel circuit of claim 53, wherein the biasing circuit comprises:
a third P-type transistor in series with a third N-type transistor;
a programmable current source; and
a programmable voltage source;
wherein the third P-type transistor corresponds to the second P-type transistor; and
wherein the third N-type transistor corresponds to the first N-type transistor.

55. The pixel circuit of claim 48, further comprising a third N-type transistor including a gate connected to a DC voltage, wherein the third N-type transistor provides leakage compensation at low light levels impinging on the photosensitive element.

56. The pixel circuit of claim 48, further comprising:
a converter that is comprised of the P-type transistor and configured to receive the current signal from the photosensitive element and generate a voltage signal based on the received current signal;
a first capacitor electrically coupled to the converter in series and configured to receive the voltage signal from the converter; and
an amplifier electrically coupled, at an input, to the first capacitor in series and configured to generate, at an output, an amplified signal based on an output signal from the first capacitor.

57. The pixel circuit of claim 56, wherein the converter and the first capacitor are implemented in a CMOS wafer with the P-type transistor.

58. The pixel circuit of claim 56, further comprising a second capacitor connected in parallel with the first capacitor, the second capacitor being implemented in a CIS wafer and connected to the first capacitor using at least two interconnects.

* * * * *